United States Patent
Nakamura et al.

(10) Patent No.: US 10,372,372 B2
(45) Date of Patent: Aug. 6, 2019

(54) STORAGE SYSTEM

(71) Applicant: Hitachi, Ltd., Tokyo (JP)

(72) Inventors: Tatsuya Nakamura, Tokyo (JP); Shintarou Inoue, Tokyo (JP); Yasuyuki Nagasoe, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 150 days.

(21) Appl. No.: 15/554,094

(22) PCT Filed: Apr. 22, 2015

(86) PCT No.: PCT/JP2015/062290
§ 371 (c)(1),
(2) Date: Aug. 28, 2017

(87) PCT Pub. No.: WO2016/170631
PCT Pub. Date: Oct. 27, 2016

(65) Prior Publication Data
US 2018/0067687 A1    Mar. 8, 2018

(51) Int. Cl.
*G06F 12/00* (2006.01)
*G06F 3/06* (2006.01)

(52) U.S. Cl.
CPC .......... *G06F 3/0649* (2013.01); *G06F 3/061* (2013.01); *G06F 3/0616* (2013.01); *G06F 3/0665* (2013.01); *G06F 3/0685* (2013.01); *G06F 3/0689* (2013.01)

(58) Field of Classification Search
CPC ....... G06F 3/0685; G06F 3/061; G06F 3/0649
See application file for complete search history.

(56) References Cited

U.S. PATENT DOCUMENTS

| 8,407,417 B2 | 3/2013 | Matsuda et al. | |
| 2012/0246386 A1* | 9/2012 | Akutsu | G06F 3/061 711/103 |
| 2015/0199268 A1* | 7/2015 | Davis | G06F 12/0246 711/103 |

OTHER PUBLICATIONS

International Search Report of PCT/JP2015/062290 dated Jul. 14, 2015.

* cited by examiner

*Primary Examiner* — Arvind Talukdar
(74) *Attorney, Agent, or Firm* — Mattingly & Malur, PC

(57) ABSTRACT

A storage system includes first storage devices to provide storage areas of a first tier and for which a life usage rate is determined based on an erase count and a guaranteed maximum erase count, second storage devices to provide storage areas of a second tier and for which a guaranteed maximum erase count is not specified, and a controller to perform data reallocation between the first tier and the second tier. The controller determines a weight for a read access and a weight for a write access from a host based on life usage rates of the first storage devices, and determines whether to relocate data stored in the second tier to the first tier based on the weight for a read access, the weight for a write access, a read count for the data in a period, and a write count for the data in the period.

8 Claims, 18 Drawing Sheets

| POOL # | POOL VOL # | PG# | CAPACITY | USAGE |
|---|---|---|---|---|
| 521 | 522 | 523 | 524 | 525 |
| 1 | 1 | 1 | 100G | 70G |
| 1 | 2 | 2 | 200G | 180G |
| 1 | 3 | 1 | 150G | 50G |
| 1 | 4 | 3 | 200G | 160G |
| 1 | 5 | 2 | 300G | 270G |
| ⋮ | ⋮ | ⋮ | ⋮ | ⋮ |

POOL VOL MANAGEMENT TABLE 502

| VIRTUAL VOL PAGE # | LONG-TERM I/O LOAD MONITOR 530 | | | | SHORT-TERM I/O LOAD MONITOR 535 | | | |
|---|---|---|---|---|---|---|---|---|
| | LONG-TERM READ COUNTER 531 | LONG-TERM WRITE COUNTER 532 | PREVIOUS IOPH (COUNT/h) 533 | PREVIOUS IOPHW (COUNT/h) 534 | SHORT-TERM READ COUNTER 536 | SHORT-TERM WRITE COUNTER 537 | SHORT-TERM I/O COUNTER 538 | TIME OF PREVIOUS DETERMINATION 539 |
| 1 | 300 | 0 | 300 | 330 | 40 | 0 | 40 | 11:22:33 |
| 2 | 1000 | 1000 | 2000 | 1500 | 30 | 40 | 50 | 11:22:34 |
| 3 | 500 | 900 | 1400 | 910 | 10 | 70 | 45 | 11:22:22 |
| ... | ... | ... | ... | ... | ... | ... | ... | ... |

PAGE MONITORING TABLE 503

*FIG. 8*

| # | REAL LIFE USAGE RATE OF TIER1 | READ COEFFICIENT | WRITE COEFFICIENT |
|---|---|---|---|
| 1 | NOT HIGHER THAN IDEAL LIFE USAGE RATE | 1.0 | 0.5 |
| 2 | HIGHER THAN IDEAL LIFE USAGE RATE (LESS THAN 3%) | 1.1 | 0.4 |
| 3 | HIGHER THAN IDEAL LIFE USAGE RATE (NOT LESS THAN 3% AND LESS THAN 5%) | 1.2 | 0.3 |
| 4 | HIGHER THAN IDEAL LIFE USAGE RATE (NOT LESS THAN 5% AND LESS THAN 7%) | 1.3 | 0.2 |
| 5 | HIGHER THAN IDEAL LIFE USAGE RATE (NOT LESS THAN 7% AND LESS THAN 10%) | 1.4 | 0.1 |
| 6 | HIGHER THAN IDEAL LIFE USAGE RATE (NOT LESS THAN 10%) | 1.5 | 0 |

READ COEFFICIENT AND WRITE COEFFICIENT SETTING TABLE 508

FIG.9

| # | REAL LIFE USAGE RATE OF TIER1 | NECESSARY READ COUNT | NECESSARY WRITE COUNT |
|---|---|---|---|
| 1 | NOT HIGHER THAN IDEAL LIFE USAGE RATE | 1 | 2 |
| 2 | HIGHER THAN IDEAL LIFE USAGE RATE (LESS THAN 3%) | 1 | 3 |
| 3 | HIGHER THAN IDEAL LIFE USAGE RATE (NOT LESS THAN 3% AND LESS THAN 5%) | 1 | 4 |
| 4 | HIGHER THAN IDEAL LIFE USAGE RATE (NOT LESS THAN 5% AND LESS THAN 7%) | 1 | 5 |
| 5 | HIGHER THAN IDEAL LIFE USAGE RATE (NOT LESS THAN 7% AND LESS THAN 10%) | 1 | 10 |
| 6 | HIGHER THAN IDEAL LIFE USAGE RATE (NOT LESS THAN 10%) | 1 | NO INCREMENT |

NECESSARY READ COUNT AND WRITE COUNT SETTING TABLE 509

FIG.10

| # | REAL LIFE USAGE RATE OF PG | PRIORITY LEVEL IN SELECTING PROMOTION DESTINATION |
|---|---|---|
| 1 | NOT HIGHER THAN IDEAL LIFE USAGE RATE | 1 |
| 2 | HIGHER THAN IDEAL LIFE USAGE RATE (LESS THAN 3%) | 2 (SELECT IF NO PG AVAILABLE FROM 1 FOR PROMOTION) |
| 3 | HIGHER THAN IDEAL LIFE USAGE RATE (NOT LESS THAN 3% AND LESS THAN 5%) | 3 (SELECT IF NO PG AVAILABLE FROM 1 AND 2 FOR PROMOTION) |
| 4 | HIGHER THAN IDEAL LIFE USAGE RATE (NOT LESS THAN 5% AND LESS THAN 7%) | 4 (SELECT IF NO PG AVAILABLE FROM 1 TO 3 FOR PROMOTION) |
| 5 | HIGHER THAN IDEAL LIFE USAGE RATE (NOT LESS THAN 7% AND LESS THAN 10%) | 5 (SELECT IF NO PG AVAILABLE FROM 1 TO 4 FOR PROMOTION) |
| 6 | HIGHER THAN IDEAL LIFE USAGE RATE (NOT LESS THAN 10%) | 6 (SELECT IF NO PG AVAILABLE FROM 1 TO 5 FOR PROMOTION) |

PROMOTION DESTINATION PG PRIORITY SETTING TABLE 510

FIG.11

| PDEV# | LIFE USAGE RATE AT ADDITION TO POOL | ELAPSED TIME AFTER ADDITION TO POOL | REAL LIFE USAGE RATE |
|---|---|---|---|
| 1 | 0% | 1.5 YEARS | 10% |
| 2 | 5% | 1 YEAR | 25% |
| 3 | 0% | 0.5 YEARS | 5% |
| ⋮ | ⋮ | ⋮ | ⋮ |

PDEV LIFE MANAGEMENT TABLE 511

FIG.12

| 561 | 562 | 563 | 564 | 565 |
|---|---|---|---|---|
| PG# | PG CONSTITUENT PDEV # | PDEV # OF PDEV HAVING SHORTEST REMAINING LIFE | REAL LIFE USAGE RATE | IDEAL LIFE USAGE RATE |
| 1 | 1, 2, 3, 4 | 2 | 25% | 30% |
| 2 | 5, 6, 7, 8, 9, 10, 11, 12 | 10 | 22% | 20% |
| 3 | 13, 14, 15, 16 | 14 | 18% | 21% |
| ⋮ | ⋮ | ⋮ | ⋮ | ⋮ |

PG LIFE MANAGEMENT TABLE 512

*FIG.13*

| 571 | 572 | 573 | 574 | 575 | 576 | 577 | 578 |
|---|---|---|---|---|---|---|---|
| POOL # | POOL VOL # | REAL LIFE USAGE RATE | IDEAL LIFE USAGE RATE | IOPHW READ COEFFICIENT | IOPHW WRITE COEFFICIENT | NECESSARY READ COUNT | NECESSARY WRITE COUNT |
| 1 | 1, 2 | 12.5% | 13% | 1.0 | 0.5 | 1 | 1 |
| 2 | 3, 4, 5 | 20% | 18.5% | 1.1 | 0.4 | 1 | 2 |
| 3 | 6, 7 | 17.5% | 12% | 1.3 | 0.2 | 1 | 5 |
| ⋮ | ⋮ | ⋮ | ⋮ | ⋮ | ⋮ | ⋮ | ⋮ |

TIER1 LIFE MANAGEMENT TABLE 513

*FIG.14*

| RELOCATION DESTINATION PRIORITY LEVEL | PG# | POOL VOL # |
|---|---|---|
| 1 | 1, 4, ... | 1, 3, 6, 10, ... |
| 2 | 2, 12 | 2, 5, 12, 21, ... |
| 3 | 3, 8, ... | 4, 13, 15, 18, ... |
| 4 | 10 | 8, 16, 19, 20, ... |
| 5 | 5, 6, ... | 9, 14, 17, 24, ... |
| 6 | 9, 11, ... | 7, 11, 22, 23, ... |

RELOCATION DESTINATION POOL VOL PRIORITY LEVEL MANAGEMENT TABLE 514

*FIG.15*

STORAGE SYSTEM

BACKGROUND

This invention relates to automated tier control for a multi-tiered storage system.

The increasing data amount, diversifying data types, and diverse drives in storage systems brought by the prevalence of solid state drives (SSDs) faster than hard disk drives (HDDs) have complicated appropriate data allocation to drive tiers having different performance capabilities. To address this issue, employment of an automatic data allocation function is being spread that automatically stores data to an appropriate storage medium in accordance with the access (I/O) frequency to the data to raise the performance of the storage system.

In general, the automatic data allocation function manages the storage area in units of page, migrates a page to a higher tier composed of high-speed drives (called promotion) when the I/O frequency to the page is high in a specific period (measurement period for load monitoring), and migrates a page to a lower tier composed of inexpensive low-speed drives (called demotion) when the I/O frequency to the page is low. For example, U.S. Pat. No. 8,407,417 discloses relocating data from a storage area included in one of a plurality of storage area groups to a storage area of a different storage area group depending on the condition of accesses to an address of a logical volume.

SUMMARY

In general, SSDs employing a flash memory as a storage medium are used for the highest tier. A flash memory has a limit in number of erases; when the number of erases exceeds the limit, data write is no longer available or even if data is written, error bits increase in a short time. For this reason, a flash device (flash drive) including a flash memory as a storage medium, like an SSD, has a life that depends on the number of erases.

The flash memory is a storage medium that does not allow overwrite of data. To reuse an area where data is written, the data in the area needs to be erased. Accordingly, the number of erases increases with the number of data writes, so that the remaining life is reduced. The SSDs and HDDs mounted in a storage system are required to be guaranteed to work for a specific period (for example, five years). However, the tier control according to U.S. Pat. No. 8,407,417 may assign a frequently-written page to a flash device having a short remaining life because the read frequency and the write frequency are not distinguished in the I/O frequency.

An aspect of this invention is a storage system configured to allocate storage areas from a plurality of tiers including a first tier and a second tier to a virtual volume, the storage system including: a plurality of first storage devices configured to provide storage areas of the first tier, a life usage rate of each of the plurality of first storage devices being determined based on an erase count and a guaranteed maximum erase count; a plurality of second storage devices configured to provide storage areas of the second tier, a guaranteed maximum erase count not being specified for each of the plurality of second storage devices; and a controller configured to perform data reallocation between the first tier and the second tier, wherein the controller is configured to: determine a weight for a read access from a host and a weight for a write access from a host based on life usage rates of the plurality of first storage devices; and determine whether to relocate data stored in the second tier to the first tier based on the weight for a read access, the weight for a write access, a read count for the data in a period, a write count for the data in the period.

An aspect of this invention achieves high-speed performance of the system while controlling the life consumption of the flash devices therein. The issues, configurations, and effects other than those described above are clarified in the following description of the embodiments.

BRIEF DESCRIPTION OF THE DRAWINGS

FIG. 8 shows I/O monitoring information on a part of the virtual VOL pages of a virtual volume;

FIG. 9 illustrates a configuration example of a read coefficient and write coefficient setting table;

FIG. 10 illustrates a configuration example of a necessary read count and write count setting table;

FIG. 11 illustrates a configuration example of a promotion destination PG priority setting table;

FIG. 12 illustrates a configuration example of a PDEV life management table;

FIG. 13 illustrates a configuration example of a PG life management table;

FIG. 14 illustrates a configuration example of a Tier1 life management table;

FIG. 15 illustrates a configuration example of a relocation destination pool VOL priority level management table;

DETAILED DESCRIPTION OF THE EMBODIMENTS

Figure 1:
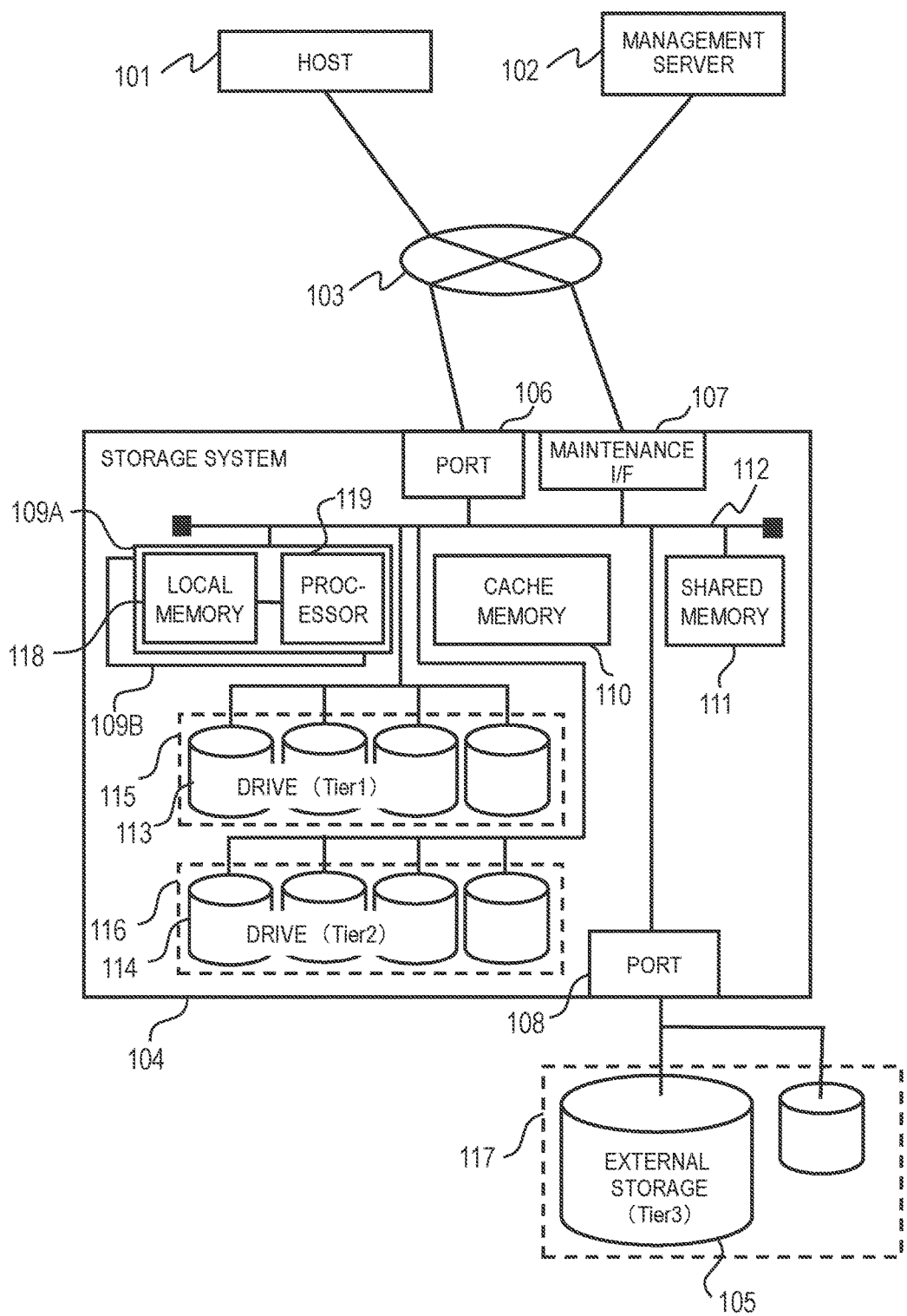
FIG. 1 illustrates a configuration example of a computer system.

Hereinafter, an embodiment of this invention is described. In the accompanying drawings, functionally same elements may be denoted by the same reference numerals. The accompanying drawings illustrate a specific embodiment and specific examples in accordance with the principle of this invention. The embodiment and examples are for understanding of this invention and should not be used to interpret this invention in limited ways.

As will be described later, the embodiment of this invention may be implemented by software operating on a general-purpose computer, dedicated hardware, or a combination of software and hardware.

In the following, information for management is described in the form of tables; however, the information for management does not need to be expressed in the data structure of table but may be expressed differently by using a different data structure such as list, DB, or queue, or by using directory structure. Accordingly, tables, lists, DBs, or queues may be referred to as merely information in order to show independence from the data structure.

In the following, description about processing in the embodiment may be provided with a subject (agent) of program. Programs are executed by a processor to perform predetermined processing using a memory and a communication port (communication control device); accordingly, the processor can be the subject of the description. A part or all of a program may be implemented by dedicated hardware or may be configured as a module. Programs may be installed in computers through a program distribution server or a non-transitory storage medium.

FIG. 1 illustrates a configuration example of a computer system in the embodiment. A host 101 can be a typical server and connected with a port 106 of a storage system 104 via a network 103. The host 101 issues data read requests and data write requests to the storage system 104. The storage system 104 executes data read and data write in response to the instructions.

The network 103 can be a storage area network (SAN) or an Ethernet network, for example. A management server 102 is connected with a maintenance I/F 107 or a port 108 of the storage system 104 via the network 103. The storage administrator sends instructions about settings and management necessary to operate the storage system to the storage system 104 with the management server 102.

An external storage 105 is connected with a port 108 of the storage system 104. The external storage 105 may be connected with the port 108 of the storage system 104 via the network 103. The volumes provided by the external storage 105 can be treated by the storage system 104 in the same way as the internal volumes of the storage system 104.

Within the storage system 104, a port 106, a maintenance I/F 107, a processor package 109, a cache memory 110, a shared memory 111, a port 108, drives 113, and drives 114 are connected by an internal network 112.

The cache memory 110 is a high-speed accessible memory for temporarily storing data as a cache so as to increase the throughput or the responsivity of the storage system 104 in I/O processing.

The processor package 109 includes a local memory 118 and a processor 119. A plurality of processor packages 109 may be mounted. The processor 119 executes processing such as data transfer between the cache memory 110 and a drive 113, 114, or the external storage 105 to process the read requests and write requests from the host 101.

The shared memory 111 stores control information necessary for the processor 119 to process read requests and write requests and to execute the functions of the storage (such as a function to copy a volume). The shared memory 111 stores information shared by the processors 119 of a plurality of processor packages 109A and 109B. The processor packages serve as the controller of the storage system.

The local memory 118 stores control information necessary for the processor 119 to process read requests and write requests and to execute the functions of the storage. The local memory 118 is an area dedicated to the processor 119. The local memory 118 stores a program to be executed by the processor 119, for example.

The drives 113 and 114 are composed of drives of a plurality of kinds different in performance capability. The kinds of the drives are hard disk drive (HDD) that has an interface such as Fibre Channel (FC), Serial Attached SCSI (SAS), or Serial Advanced Technology Attachment (SATA) and solid state drive (SSD) having high I/O throughput capability and I/O response capability compared to the HDD. An SSD is a flash device including a flash medium.

The plurality of kinds of drives are classified into tiers 115, 116, and 117 each composed of drives having similar capabilities. The relation among the tiers is defined in accordance with the levels of the capability. Tier1, Tier2, and Tier3 are provided usually in order from the highest-capability drives (such as SSDs) to the lowest-capability drives. The drives in the external storage 105 can be managed as the lowest tier, assuming their capabilities are low, or the user can set the level of the tier through the maintenance I/F 107, depending on the capability of the external storage 105.

In this embodiment, Tier1 is composed of the storage areas of drives for which a guaranteed maximum erase count is determined by the specifications and the other tiers are composed of the storage areas of drives for which a guaranteed maximum erase count is not determined by the specifications. Specifically, Tier1 is composed of the storage areas of SSDs (flash devices) and the other tiers are composed of the storage areas of hard disk drives (HDDs).

Figure 2:
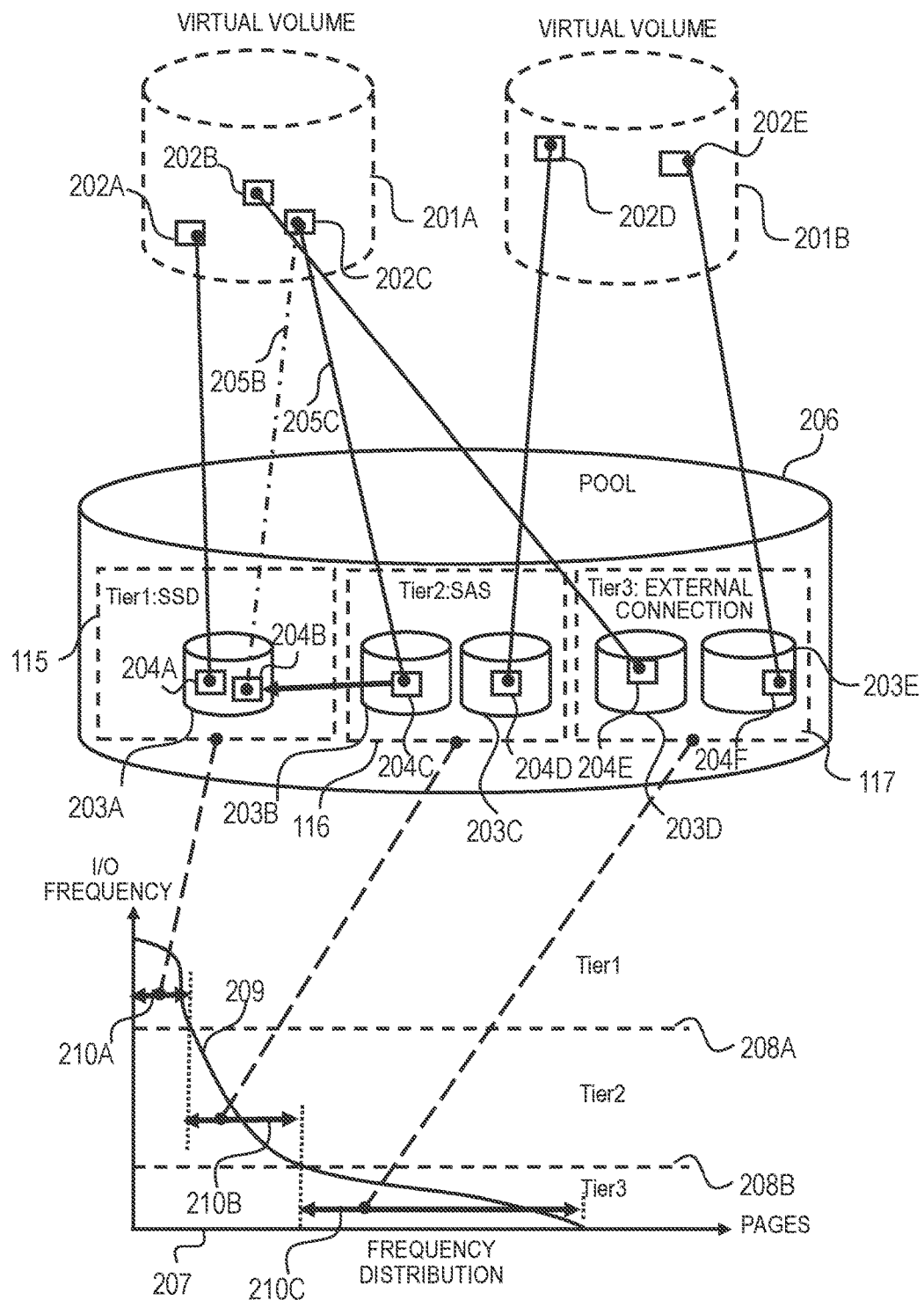
FIG. 2 illustrates a logical configuration of a storage system.

FIG. 2 illustrates a logical configuration of the storage system in this embodiment. Virtual volumes (virtual VOLs) 201A and 201B provided by the processor 119 to the host are logical storage areas recognized by the host 101 and become a target of a read request or a write request issued by the host 101.

A pool 206 is composed of one or more pool volumes (pool VOLs) 203A to 203E. Each of the pool volumes 203A to 203E is composed of the storage areas of drives 113, 114 or drives of the external storage 105 and classified in accordance with the tier the drives belong to. That is to say, the overall storage area of the pool 206 is formed of a plurality of tiers.

In this example, the pool 206 has three tiers: the tier 115 of SSD (corresponding to the pool volume 203A), the tier 116 of SAS (corresponding to the pool volumes 203B and 203C), and the tier 117 of external connection (corresponding to the pool volumes 203D and 203E).

A processor 119 allocates an unused storage area from the pool 206 in units of storage area having a predetermined size (called a page or pool VOL page) for the storage area in the virtual volume (201A, for example) designated by a write request issued by the host 101. One virtual volume is allocated storage areas only from a single pool.

In response to a read/write request from the host 101 to the same storage area of the virtual volume, the processor 119 performs I/O processing to the already allocated area of the pool volume 203. A unit storage area in a virtual volume having a predetermined size is called a page or virtual VOL page. In FIG. 2, the virtual VOL pages 202A, 202B, 202C, 202D, and 202E are allocated pool VOL pages 204A, 204E, 204C, 204E, and 204F, respectively.

The processor 119 processes I/O requests (read and write requests) as if the host 101 performed I/O processing to the virtual volumes 201A and 201B. Virtual volumes enable efficient utilization of the limited storage capacity by being allocated only the areas (pages) to be used from the pool volumes.

Each virtual VOL page constituting the virtual volumes 201A and 201B has characteristics about I/O processing from the host. This is called access locality. For example, when a virtual volume includes a virtual VOL page with high I/O frequency and a virtual VOL page with low I/O frequency, allocating the data in the virtual VOL page with high I/O frequency to a higher tier can usually raise the performance of the overall system.

For example, assume that the SSD tier 115 can process 100 IOPS (Input Output Per Second) and the SAS tier 116 can process 10 IOPS. Further, assume that the virtual VOL page 202C having a characteristic of 50 IOPS is assigned to the SAS tier 116 and the virtual VOL page 202A having a characteristic of 20 IOPS is assigned to the SSD tier 115.

The proportion of IOPS from the host to the pages is usually uniform; accordingly, the storage system 104 shows the performance of only 10 (the upper limit of SAS tier 116)+20=30 IOPS. This state is called a neck state. If the page 202C is promoted from the SAS tier 116 to the SSD tier 115, the storage system 104 can show the performance of 50+20=70 IOPS.

The promotion is specifically made by copying the data in a pool VOL page 204C to an unused pool VOL page 204B and changing the correspondence 205C between the virtual VOL page 202C and the pool VOL page 204C to a correspondence 205B between the virtual VOL page 202C and the pool VOL page 204B. Data reallocation by demotion can be performed in the same way. Promotion/demotion is performed within the same pool.

The frequency distribution 207 illustrates a distribution of I/O frequencies of the pool VOL pages or corresponding virtual VOL pages. The I/O frequency can be the I/O count per hour (IOPH), for example. The graph 209 indicates the I/O frequencies on the vertical axis for the pages sorted from left to right in descending order of I/O frequency. A tier assignment threshold is the threshold for assigning a page with what I/O frequency to which tier.

The pages included in the highest I/O frequency range 210A are assigned to the tier 115 of Tier1 (in this example, the SSD tier). The range 210A is a range from the intersection of the tier assignment threshold 208A and the graph 209 representing the frequency distribution to the page with the highest I/O frequency.

The pages included in the second-highest I/O frequency range 210B are assigned to the tier 116 of Tier2 (in this example, the SAS tier). The range 210B is a range from the intersection of the tier assignment threshold 208A and the graph 209 representing the frequency distribution to the intersection of the tier assignment threshold 208B and the graph 209 representing the frequency distribution.

The pages included in the lowest I/O frequency range 210C are assigned to the tier 117 of Tier3 (in this example, the tier of the external storage 105). The range 210C is a range from the intersection of the tier assignment threshold 208B and the graph 209 representing the frequency distribution to the page with the lowest I/O frequency. In this way, virtual VOL pages can be allocated pool VOL pages from a higher tier in descending order of I/O frequency.

The tier assignment thresholds 208A and 208B may be specified by the storage administrator or calculated by the storage system 104. Their initial values (the values when the frequency distribution is not yet created after the storage system 104 is started up) may be 0 and virtual VOL pages may be sequentially allocated pool VOL pages from the highest tier.

Hereinafter, page redistribution in this embodiment is described. The page redistribution is to reassign each virtual VOL page assigned to a tier to a different tier, that is, to determine a new tier to store the data of the virtual VOL page and relocate the data to a storage area (pool VOL page) of the determined tier. The storage system 104 of this embodiment performs tier control for the data in different kinds of cycles based on the results of long-term I/O (load) monitoring and short-term I/O (load) monitoring.

The storage system 104 determines where to reassign a page based on the I/O monitoring result in a predetermined period (long-term period). Specifically, the storage system 104 creates a frequency distribution 207 on a pool 206 based on the I/O monitoring results in a specific long-term period (for example, 12 hours) and determines the tier assignment thresholds 208 and 208B, as shown in FIG. 2.

The storage system 104 determines the values of a long-term I/O frequency indicator for individual virtual VOL pages from the I/O counts of the virtual VOL pages in a long-term period and determines where to reassign the virtual VOL pages based on the values of the I/O frequency indicator and the tier assignment thresholds 208A and 208B. The storage system 104 determines page distribution based on the long-term load and further, performs data reallocation among tiers based on the I/O frequencies of virtual VOL pages in a short-term period using a criterion different from the long-term load.

The storage system 104 selects a virtual VOL page to be subjected to short-term promotion and reassigns the virtual VOL page to Tier1 if the I/O frequency indicator of the virtual VOL page in a short-term period reaches a predetermined value. Assigning page data abruptly having frequent I/Os to Tier1 in addition to considering the long-term stable hit rate to Tier1 can increase the overall hit rate to Tier1.

The storage system 104 performs promotion of page data in a lower tier to Tier 1 after performing demotion of page data in Tier1 to prepare a vacant page area, if necessary. For example, the storage system 104 selects a page to be demoted from Tier1 based on the relation among the tier assignment thresholds 208A, 208B, the long-term load, and the short-term load. The storage system 104 selects page data whose long-term/short-term load is higher than the page to be demoted and whose short-term load is higher than the predetermined threshold as the page data to be promoted.

As to the short-term promotion/demotion, the storage system 104 determines whether to relocate data from a tier to another not depending on a predetermined period having a fixed length but synchronously with I/O processing. For example, whether to relocate data is determined synchronously with receipt of a read request or destage of write data to a drive.

In this embodiment, Tier1 is composed of the storage areas of SSDs of flash devices and the other tiers are composed of the storage areas of HDDs. The flash device has a life that depends on the erase count; the erase count increases with data write count, so that the remaining life is reduced.

The page redistribution in this embodiment gathers high-load pages to Tier1 to increase the hit rate of Tier1; however, this could expedite the drive life consumption of SSDs so that the SSDs may get failed in much shorter time than the lifetime according to the specifications. The storage system 104 of this embodiment controls the allocation of page data to Tier1 in view of the drive life consumption caused by concentration of high-load pages.

Specifically, the storage system 104 determines the weights (degrees of severity) for a read access and a write access based on the life usage rate of Tier1 and calculates the long-term I/O frequency indicator and the short-term I/O frequency indicator using the weights. The life usage rate is the rate of the used life and expressed by erase count/guaranteed maximum erase count. The weight for a write access is equal to or smaller than the weight for a read access. This configuration reduces the increase in total write count in Tier1 to reduce the life consumption of Tier1.

The life usage rate of Tier1 is described. The life usage rate of Tier1 is determined from the life usage rates of the pool volumes in Tier1. Usually, Tier1 is composed of a plurality of pool volumes. The life usage rate of a pool volume is the same as the life usage rate of the parity group (PG) providing storage area for the pool volume. A parity group is a group of drives configured to achieve redundancy and also called a RAID group.

Figure 3:
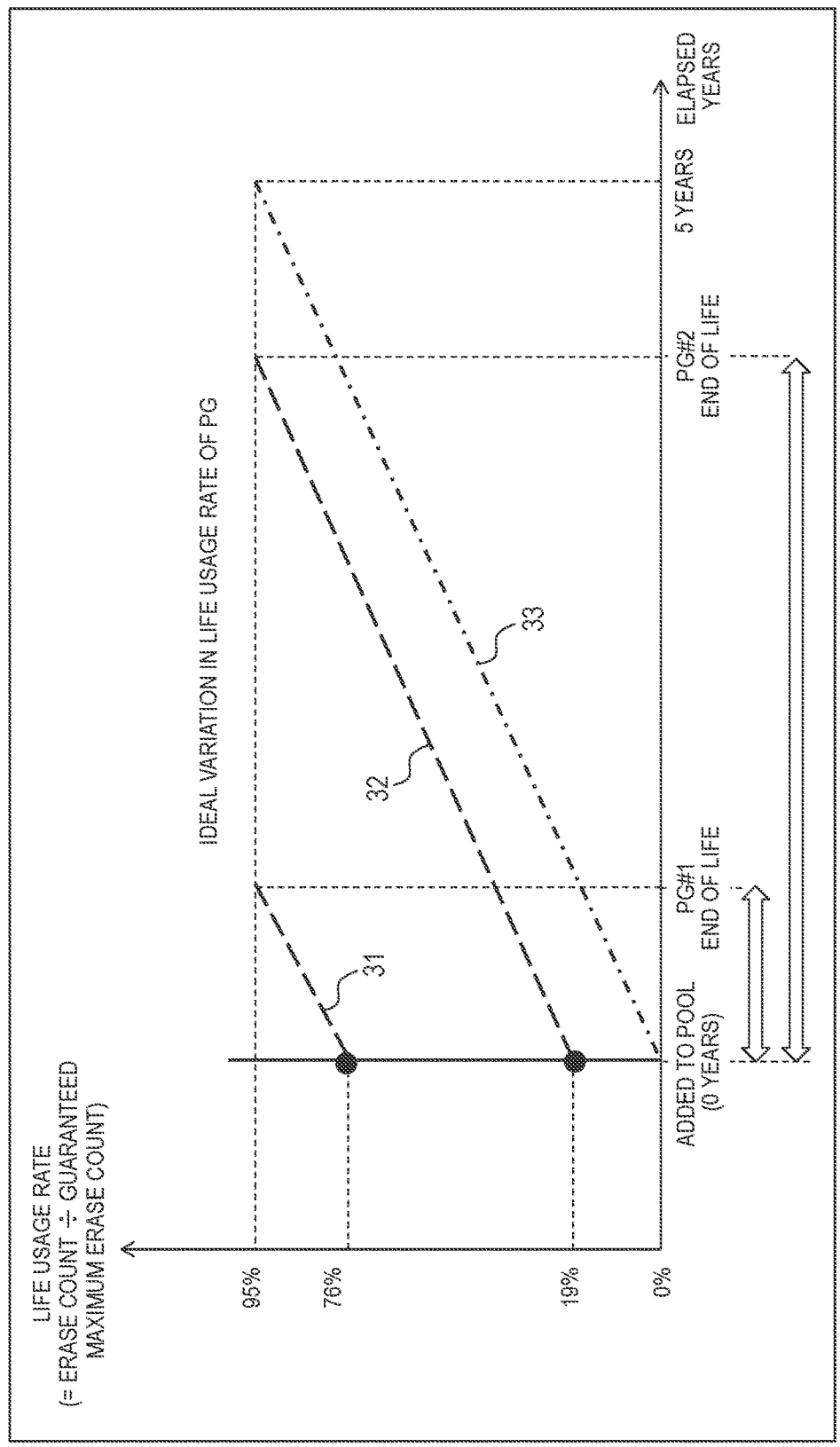
FIG. 3 illustrates examples of ideal variations in life usage rate of parity groups.

FIG. 3 illustrates examples of ideal variations in life usage rate of parity groups. The ideal variation in life usage rate is determined in designing the storage system 104. In the example of FIG. 3, the ideal variation in life usage rate is 95% for five years as shown in the line 33. The lines 31 and 32 represent the ideal life usage rates of the parity groups of PG #1 and PG #2.

As to the example of the line 31, the remaining life rate of the parity group PG #1 (the pool volumes thereof) when the parity group PG #1 is added to the pool is 24%. The ideal pace of using the life rate is 95% for five years; the remaining life rate 19% is used in one year.

As to the example of the line 32, the remaining life rate of the parity group PG #2 (the pool volumes thereof) when the parity group PG #2 is added to the pool is 81%. The ideal pace of using the life rate is 95% for five years; the remaining life rate 76% is used in four years.

Figure 4:
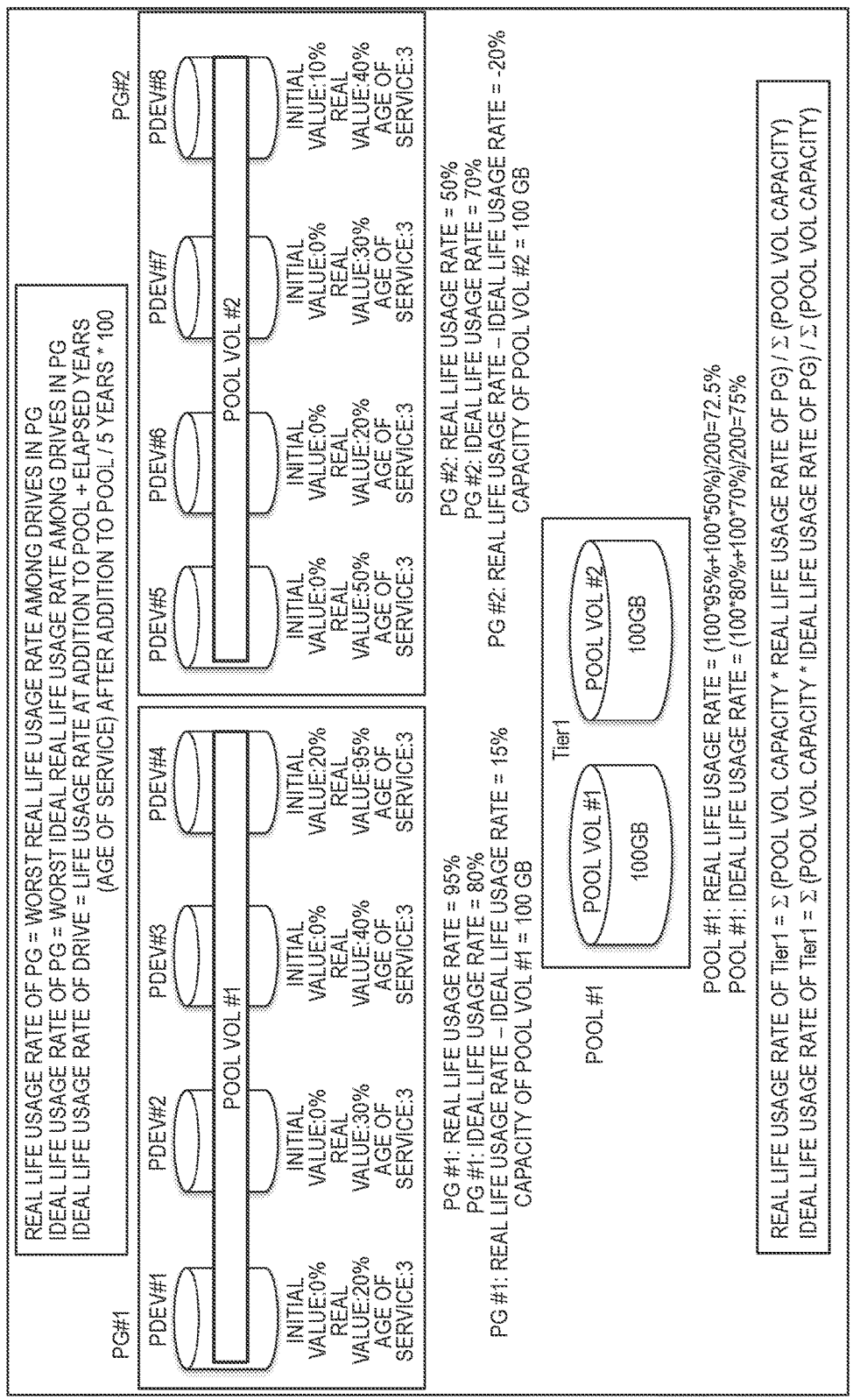
FIG. 4 illustrates an example of the relation among the life usage rates of Tier1, pool volumes, parity groups, and drives.

FIG. 4 illustrates an example of the relation among the life usage rates of Tier1 (pool), pool volumes, parity groups, and drives (PDEVs). A parity group is a group of drives for redundancy and the life usage rate of a parity group corresponds to the highest value (worst value) in the life usage rates of the drives included in the parity group.

Real life usage rate of PG=Worst real life usage rate among drives in PG

Ideal life usage rate of PG=Worst ideal real life usage rate among drives in PG

The real life usage rate of a drive is determined from the actual erase count/guaranteed maximum erase count of the drive and each drive manages the value. The ideal life usage rate of a drive is determined from the life usage rate (initial life usage rate) when the drive is added to the pool and the elapsed years (age of service) after the addition to the pool and calculated by the following formula, for example.

Ideal life usage rate of drive=Initial life usage rate+ Age of service/5 years*100

For example, the pool volume POOL VOL #1 belongs to the parity group PG #1. In the parity group PG #1, the highest value among the real life usage rates of the drives therein is 95% and the highest ideal life usage rate is 20+3/5 years*100=80%. Accordingly, the real life usage rate and the ideal life usage rate of the parity group PG #1 are 95% and 80%, respectively, and the difference therebetween is 15%.

The pool volume POOL VOL #2 belongs to the parity group PG #2. In the parity group PG #2, the highest value among the real life usage rates of the drives therein is 50% and the highest ideal life usage rate is 10+3/5 years*100=70%. Accordingly, the real life usage rate and the ideal life usage rate of the parity group PG #2 are 50% and 70%, respectively, and the difference therebetween is −20%.

The life usage rate of Tier1 in a pool is determined from the life usage rates of the pool volumes included in Tier1 by the following formulae, for example.

Real life usage rate of Tier1=Σ(Pool VOL capacity*Real life usage rate of PG)/Σ(Pool VOL capacity)

Ideal life usage rate of Tier1=Σ(Pool VOL capacity*Ideal life usage rate of PG)/Σ(Pool VOL capacity)

As described in the above, the life usage rate of a pool volume is the same as the life usage rate of the parity group; the life usage rate of Tier1 is the product sum of the capacities of the pool volumes and the life usage rates. For example, in the pool POOL #1, Tier1 is composed of pool volumes of POOL VOL #1 and POOL VOL #2 each having a capacity of 100 GB. The real life usage rate of Tier1 in the pool POOL #1 is (100*95%+100*50%)/200=72.5%. The ideal life usage rate of the same is (100*80%+100*70%)/200=75%.

The life usage rate may be calculated using an indicator (degree of deterioration) representing the deterioration of each block as follows. To calculate the degree of deterioration, the time after the last data write to a block until the erase of the data (hereinafter, referred to as PE (Program-Erase) interval) is used. This is because the flash memory has a characteristic that a block deteriorates more easily as the PE interval is shorter. The degree of deterioration is calculated by adding a score in accordance with the PE interval in erasing data stored in a block. For example, defining the maximum degrees of deterioration for each block to be 10,000 points, a score determined to be lower as the PE interval is longer is added, for example, 20 points for the PE interval of less than five minutes and 15 points for the PE interval not less than 5 minutes and less than 10 minutes. As a result, the life can be calculated more accurately.

The real life usage rate using the degree of deterioration is calculated by actual degrees of deterioration of a drive (the sum of degrees of deterioration of blocks in the drive)/maximum degrees of deterioration of the drive (the sum of maximum degrees of deterioration of blocks in the drive).

Figure 5:
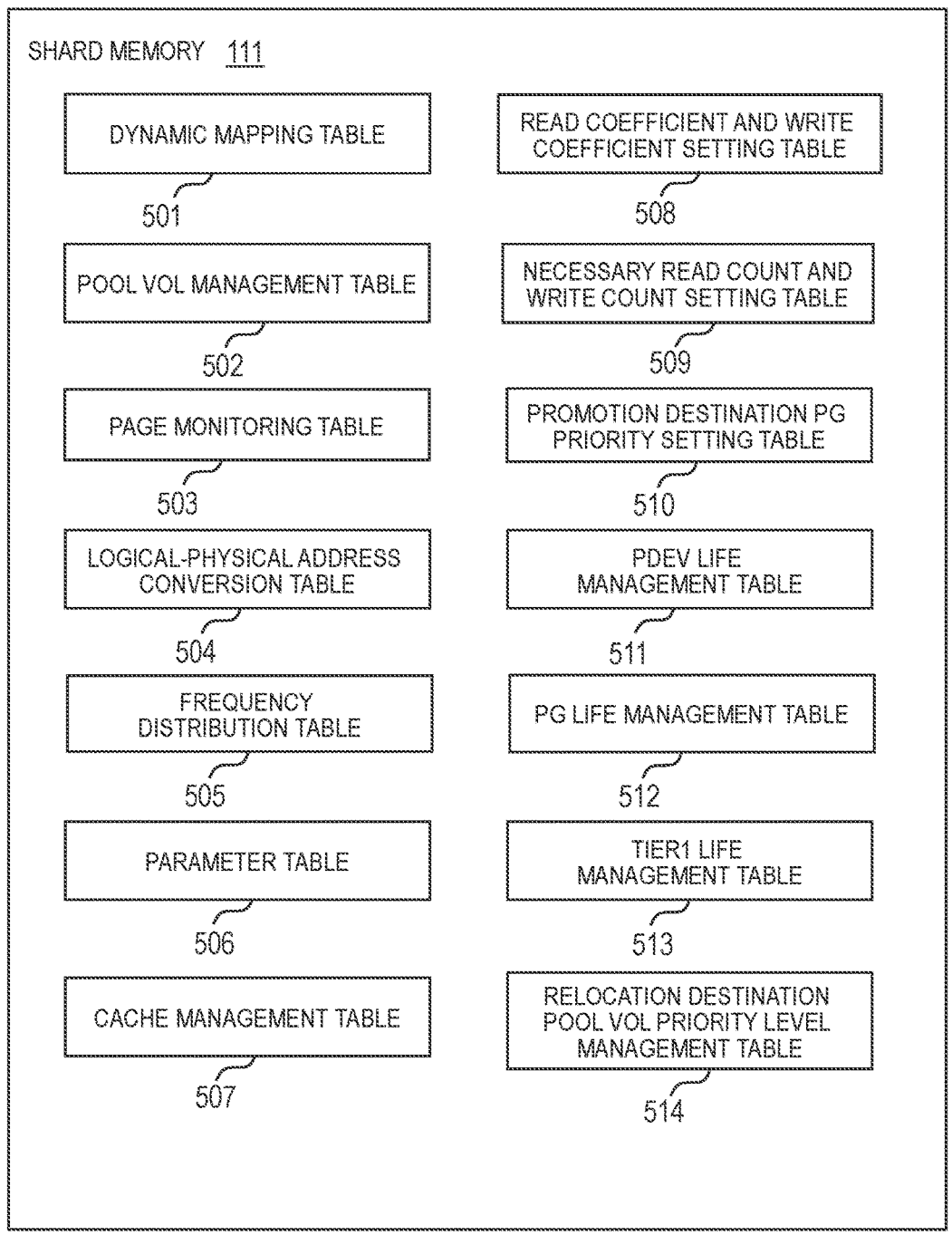
FIG. 5 illustrates information (tables) stored in a shared memory.
Figures 6, 7:
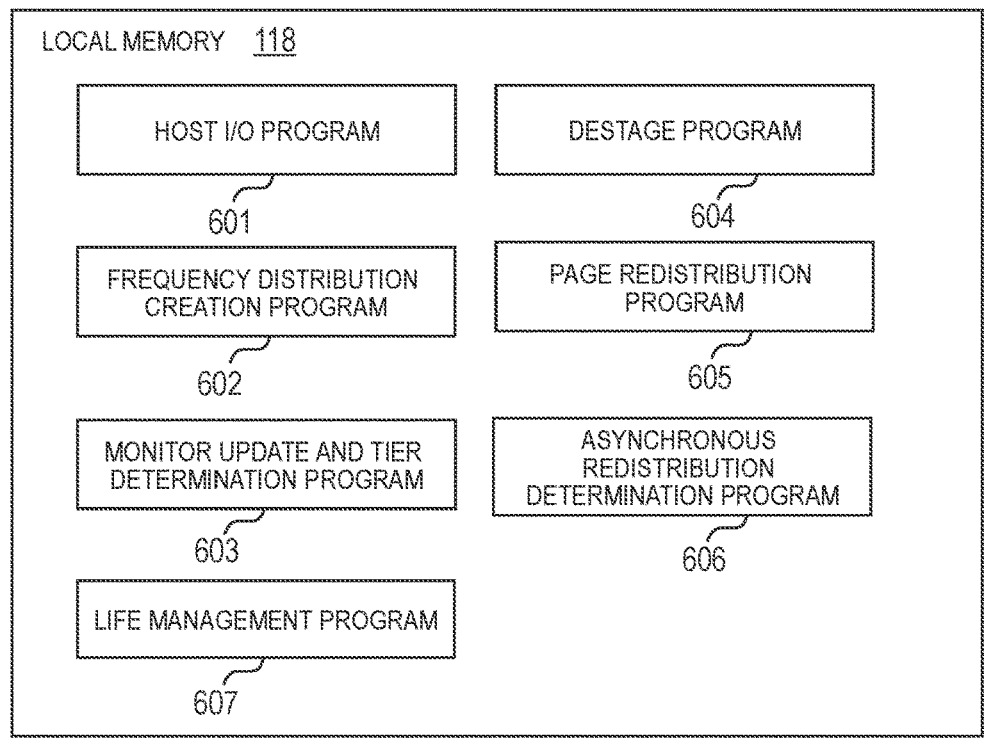
FIG. 6 illustrates programs stored in a local memory.
FIG. 7 illustrates a configuration example of a pool VOL management table.

FIG. 5 illustrates information (tables) stored in the shared memory 111 and FIG. 6 illustrates programs stored in the local memory 118. The locations of these tables and programs are not limited to the illustrated locations but may be the local memory 118, the shared memory 111, drives 113, 114, or a space hierarchically managed among these.

The dynamic mapping table 501 manages correspondence relations of virtual VOL pages, areas of pool volumes allocated to the virtual VOL pages, and monitoring information on the virtual VOL pages. Each virtual VOL page is identified by a virtual volume identifier and a logical address; each area in a pool volume is identified by a pool volume identifier and a logical address. Each logical address is associated with a virtual VOL page number by a specified formula.

The dynamic mapping table 501 also manages default value pages storing a specific initial value data (such as 0 data) and areas of virtual volumes where data has never been written yet. The dynamic mapping table 501 further manages storage areas (pool VOL pages) unallocated to a virtual volume in the pool. When the first data write is requested to a logical address of a virtual volume where data has never been written, an unallocated pool VOL page is associated with the virtual VOL page to be written.

The pool VOL management table 502 manages relations of parity groups, pool volumes, and the capacities of the pool volumes. The logical-physical address conversion table 504 shows the correspondence relations of the addresses (storage areas) of pool volumes, parity groups, and the drives storing data of the pool volumes.

The frequency distribution table 505 manages the distribution of the numbers of pages by I/O frequency range within a pool. An entry of the frequency distribution table 505 shows an I/O frequency range defined for the pool and the number of pages included in the I/O frequency range. The frequency distribution table 505 also manages tier assignment thresholds. A tier assignment threshold does not have to be the boundary between I/O frequency ranges. The parameter table 506 manages parameters, which can be set through the maintenance I/F 107.

The cache management table 507 manages whether the state of data in the cache memory 110 is dirty or clean in storing data to the cache memory 110. In caching write data for a virtual volume, the address of the virtual VOL page is associated with the address in the cache memory 110 and managed in the cache management table 507.

The read coefficient and write coefficient setting table 508 indicates the weights for a read access and a write access to be used in calculating a long-term I/O frequency in view of the life usage rate of Tier1. The necessary read count and write count setting table 509 indicates the weights for a read access and a write access to be used in calculating a short-term I/O frequency in view of the life usage rate of Tier1. The promotion destination PG priority setting table 510 shows relations between a priority level for a parity group to be assigned to a virtual VOL page and a life usage rate of the parity group in promotion of the virtual VOL page to Tier1.

The PDEV life management table 511 manages the lives of the physical drives. The PG life management table 512 manages the lives of the parity groups providing storage area to Tier1. The Tier1 life management table 513 manages the life of Tier1 in each pool. The relocation destination pool VOL priority level management table 514 manages the priority levels of destination pool volumes in Tier1 in relocating page data.

FIG. 6 illustrates programs to be executed by the processor 119. The host I/O program 601 processes a read/write request for a virtual volume 201 upon receipt of an I/O from the host 101. The destage program 604 saves the data in the cache memory not yet stored in a drive to a drive, asynchronously with a host I/O.

The frequency distribution creation program 602 calculates the tier assignment thresholds at a predetermined cycle, specifically, a cycle of the aforementioned long-term period. The monitor update/tier determination program 603 updates a variety of information in the page monitoring table 503 and determines whether to relocate page data from a tier to another synchronously with the host I/O processing. This program performs promotion to Tier1 or demotion from Tier1.

The asynchronous redistribution determination program 606 is started upon completion of creation of the frequency distribution and determines an appropriate tier for each page with reference to the page monitoring table 503 at a predetermined cycle. The page redistribution program 605 is a program for redistributing the pages and is executed periodically.

The life management program 607 manages the lives of the drives, parity groups, and Tier1 of the pool. A part of the tables and programs shown in FIGS. 5 and 6 can be provided to and executed by the host 101 or the management server 102.

FIG. 7 illustrates a configuration example of the pool VOL management table 502. The pool VOL management table 502 manages information on each pool volume: a pool #521 of the pool including the pool volume, a pool VOL #522 of the pool volume, a PG #523 of the parity group to which the pool volume provides the storage area, a capacity 524 of the pool volume, and a usage 525 of the pool volume. The pool #, pool VOL #, and PG # are the identifiers of the pool, the pool volume, and the parity group, respectively.

A page monitoring table 503 manages I/O monitoring information on each page. FIG. 8 illustrates a configuration example of the page monitoring table 503. FIG. 8 shows the I/O monitoring information on a part of the virtual VOL pages of a virtual volume.

Each virtual VOL page is identified by a virtual VOL page #. The virtual VOL page # is the identifier of a page in a virtual volume. The section 530 of the long-term I/O load monitor stores values of a long-term read counter 531, a long-term write counter 532, a previous IOPH 533, and a previous IOPHW 534 for each virtual VOL page. In this example, a long-term period is defined with specific time (such as 6 hours or 24 hours). The length of the long-term period can be set depending on the pool and stored in the parameter table 506, for example.

The long-term read counter 531 counts read accesses to the virtual VOL page in the current long-term period. The long-term write counter 532 counts write accesses to the virtual VOL page in the current long-term period. The previous IOPH 533 stores the value of the IOPH in the previous long-term period. The IOPH is I/O frequency, specifically, the I/O count per hour. The value of the previous IOPH 533 is the sum of the read frequency and the write frequency in the previous long-term period, specifically, the sum of the read count per hour and the write count per hour in the previous long-term period.

The previous IOPHW 534 stores the value of the IOPHW in the previous long-term period. The IOPHW is an I/O frequency indicator to be referenced to determine whether to relocate the page to Tier1 in view of the life of Tier1. The IOPHW is calculated by the following formula:

$$IOPHW = \text{Read frequency(count/h)} * \text{Read coefficient} + \text{Write frequency(count/h)} * \text{Write coefficient}$$

The read coefficient and the write coefficient are determined in accordance with the life usage rate of Tier1 and are the weights for a read access and a write access in a long-term period.

FIG. 9 illustrates a configuration example of the read coefficient and write coefficient setting table 508. The read coefficient and write coefficient setting table 508 shows relations of a life usage rate of Tier1 and a pair of a read coefficient and a write coefficient to be used in calculating a long-term IOPHW. Each #541 indicates the entry number in the table.

A real life usage rate of Tier1 542 indicates a range of real life usage rate of Tier1 in comparison to the ideal life usage rate. In this example, the real life usage rate of Tier1 542 indicates a range of percentage of the difference of the real life usage rate from the ideal life usage rate relative to the ideal life usage rate. The real life usage rate of Tier1 542 does not need to be the value compared to the ideal life usage rate but can be merely a range of real life usage rate. The same applies to the other setting tables 509 and 510. A read coefficient 543 and a write coefficient 544 are the read coefficient and the write coefficient, respectively, for the range indicated in the real life usage rate of Tier1 542.

The write coefficient decreases stepwise as the excess of the real life usage rate over the ideal life usage rate increases. This configuration lowers the possibility that data in a page written frequently is relocated to Tier1 whose real life usage rate is high relative to the ideal life usage rate, diminishing the increase in real life usage rate of Tier1.

In contrast, the read coefficient increases stepwise as the excess of the real life usage rate over the ideal life usage rate increases. This configuration increases the possibility that data in a page read frequently is relocated to Tier1 where the real life usage rate is high relative to the ideal life usage rate, preventing the hit rate of Tier1 from dropping. The read coefficient can be a fixed value.

Returning to FIG. 8, the section 535 of the short-term I/O load monitor stores values of a short-term read counter 536, a short-term write counter 537, a short-term I/O counter 538, and a time of previous determination 539 for each virtual VOL page. In this example, a short-term period is defined with the value of the short-term I/O counter 538; the period where the short-term I/O counter 538 counts from 0 to a predetermined value is one short-term period. Accordingly, the lengths of the short-term periods are not uniform. When the short-term I/O counter 538 reaches the predetermined value, the value is reset to execute short-term tier determination.

The short-term read counter 536 counts read accesses to the virtual VOL page in the current short-term period. The short-term write counter 537 counts write accesses to the virtual VOL page in the current short-term period. The short-term I/O counter 538 stores the value determined from the values of the short-term read counter 536 and the short-term write counter 537. The time of previous determination 539 stores the time of tier determination in the previous short-term period.

Using the time taken for the value of the short-term I/O counter 538 to reach a predetermined value, a short-term I/O frequency indicator in view of the life of Tier1 to be used in tier determination is calculated. Specifically, the following formula is used:

Short-term I/O frequency=Predetermined count value/Time taken to reach the predetermined counter value(count/h)

The value of the short-term I/O counter 538 for a virtual VOL page is incremented each time the virtual VOL page is read for a predetermined number of times. That is to say, when the value of the short-term read counter 536 reaches the predetermined value, the value of the short-term I/O counter 538 is incremented. The value of the short-term read counter 536 is reset.

Furthermore, the value of the short-term I/O counter 538 for the virtual VOL page is incremented each time the virtual VOL page is written for a predetermined number of times. That is to say, when the value of the short-term write counter 537 reaches the predetermined value, the value of the short-term I/O counter 538 is incremented. The value of the short-term write counter 537 is reset.

The predetermined values for the read accesses and the write accesses, more specifically, the inverses of the predetermined values correspond to the weights in the short-term period that are determined in accordance with the life usage rate of Tier1. FIG. 10 illustrates a configuration example of the necessary read count and write count setting table 509.

The necessary read count and write count setting table 509 indicates relations between a life usage rate of Tier1 and read and write counts necessary to increment the value of the short-term I/O counter 538. Each #545 indicates the entry number in the table.

A real life usage rate of Tier1 546 is a range of real life usage rate in comparison to the ideal life usage rate of Tier1. In this example, the real life usage rate of Tier1 546 indicates a range of percentage of the difference of the real life usage rate from the ideal life usage rate relative to the ideal life usage rate. In this example, the ranges in the individual entries in the column of the real life usage rate of Tier1 546 are the same as those in the read coefficient and write coefficient setting table 508.

A necessary read count 547 and a necessary write count 548 respectively indicate the read count and the write count necessary to increment the value of the short-term I/O counter 538 in the corresponding range of the real life usage rate of Tier1 546. That is to say, when a virtual VOL page receives a read access for the number of times indicated in the necessary read count 547, the value of the short-term I/O counter 538 is incremented.

Furthermore, when a virtual VOL page receives a write access for the number of times indicated in the necessary write count 548, the value of the short-term I/O counter 538 is incremented. When the excess of the real life usage rate over the ideal life usage rate is 10% or more of the ideal life usage rate, the value of the short-term I/O counter 538 is not incremented with a write access.

The value of the necessary write count 548 increases stepwise as the excess of the real life usage rate over the ideal life usage rate increases. That is to say, as the deviation of the real life usage rate from the ideal life usage rate becomes larger, the write count required to increment the value of the short-term I/O counter 538 becomes larger stepwise.

This configuration lowers the possibility that data in a page written frequently is relocated to Tier1 where the real life usage rate is high relative to the ideal life usage rate, diminishing the increase in real life usage rate of Tier1. Furthermore, the frequency of promotion to Tier1 is lowered to reduce the concentration of write load to Tier1.

Although the values of the necessary read count 547 are fixed in the foregoing example, the necessary read count 547 may become smaller as the real life usage rate higher than the ideal life usage rate deviates from the ideal life usage rate. That is to say, the value of the short-term I/O counter 538 may be incremented for multiple times in response to one read request. The necessary read count is expressed in a number smaller than 1. The value of the short-term I/O counter 538 may be decremented from the initial value to a predetermined value (for example, 0). When the value of the short-term I/O counter 538 reaches 0, tier determination is executed. The unit of increment/decrement can be a value greater than 1.

FIG. 11 illustrates a configuration example of the promotion destination PG priority setting table 510. The promotion destination PG priority setting table 510 is specified by the user in advance. Each #551 indicates an entry number. A real life usage rate of PG 552 is a range of real life usage rate in comparison to the ideal life usage rate of a parity group.

In this example, the real life usage rate of PG 552 indicates a range of percentage of the difference of the real life usage rate from the ideal life usage rate relative to the ideal life usage rate. A priority level for selecting promotion destination 553 indicates the priority level of a parity group to store the page data to be promoted. The priority level is highest for a parity group whose real life usage rate is lower than the ideal life usage rate and is lowered as the real life usage rate increases relative to the ideal life usage rate.

FIG. 12 illustrates a configuration example of the PDEV life management table 511. The life management program 607 updates the PDEV life management table 511 with a configuration change of the storage system 104 and also, periodically. The configuration change can be addition or removal of a drive to the system or to a pool, for example.

Each PDEV #554 indicates the identifier of a drive. A life usage rate at addition to pool 555 indicates the real life usage rate when the drive (the volume thereof) is added to the pool. An elapsed time after addition to pool 556 indicates the elapsed time (age of service) after the drive is added to the pool. The elapsed time is updated periodically.

A real life usage rate 557 indicates the real life usage rate of the drive. The value of the real life usage rate is managed by the internal controller of the drive and the life management program 607 acquires the value of the real life usage rate from the drive to update the value of the real life usage rate 557.

FIG. 13 illustrates a configuration example of the PG life management table 512. The life management program 607 updates the PG life management table 512 with a configuration change of the storage system 104 and also, periodically. Each PG #561 indicates the identifier of a parity group. A PG constituent PDEV #562 indicates the PDEV numbers of the drives constituting the parity group. A PDEV # of PDEV having shortest remaining life 563 indicates the PDEV number of the drive having the shortest remaining life in the parity group.

A real life usage rate 564 indicates the real life usage rate of the parity group. As described with reference to FIG. 4, the real life usage rate of a parity group corresponds to the worst real life usage rate among the real life usage rates of the drives in the parity group. An ideal life usage rate 565 indicates the ideal life usage rate of the parity group. As described with reference to FIG. 4, the ideal life usage rate of the parity group corresponds to the worst ideal life usage rate among the ideal life usage rates of the drives in the parity group. The ideal life usage rate of a drive is calculated from the real life usage rate when the drive is added to the pool and the age of service.

FIG. 14 illustrates a configuration example of the Tier1 life management table 513. The life management program 607 updates the Tier1 life management table 513 with a configuration change of the storage system 104 and also, periodically. Each pool #571 indicates the identifier of a pool. A pool VOL #572 indicates the identifiers of the pool volumes included in Tier1 of the pool. A real life usage rate 573 indicates the real life usage rate of the Tier1 of the pool. As described with reference to FIG. 4, the real life usage rate of Tier1 is calculated from the real life usage rates and the capacities of the pool volumes included in the Tier1.

An ideal life usage rate 574 indicates the ideal life usage rate of the Tier1 of the pool. As described with reference to FIG. 4, the ideal life usage rate of Tier1 is calculated from the ideal life usage rates and the capacities of the pool volumes included in the Tier1.

An IOPHW read coefficient 575 and an IOPHW write coefficient 576 indicate coefficients to be used in calculating IOPHW. The values of the IOPHW read coefficient 575 and the IOPHW write coefficient 576 are determined from the real life usage rate and the ideal life usage rate of the Tier1 and the read coefficient and write coefficient setting table 508.

A necessary read count 577 and a necessary write count 578 respectively indicate a read count and a write count necessary to increment the value of the short-term I/O counter 538 and are determined from the real life usage rate and the ideal life usage rate of the Tier1 and the necessary read count and write count setting table 509.

FIG. 15 illustrates a configuration example of the relocation destination pool VOL priority level management table 514. Each relocation destination priority level 571 indicates a priority level for the destination of page data to be relocated to Tier1. This corresponds to the value of the priority level in selecting promotion destination 553 in the promotion destination PG priority setting table 510. A PG #572 indicates the identifiers of parity groups assigned the priority level. A pool VOL #573 indicates the identifiers of pool volumes assigned the priority level.

The life management program 607 creates the relocation destination pool VOL priority level management table 514 and updates it periodically. The life management program 607 acquires the values of the real life usage rate 573 and the ideal life usage rate 574 from the Tier1 life management table 513. The life management program 607 determines the priority levels for the pool volumes in accordance with the promotion destination PG priority setting table 510. The life management program 607 determines the priority levels for the parity groups in the same way in accordance with the PG life management table 512 and the promotion destination PG priority setting table 510.

Figure 16:
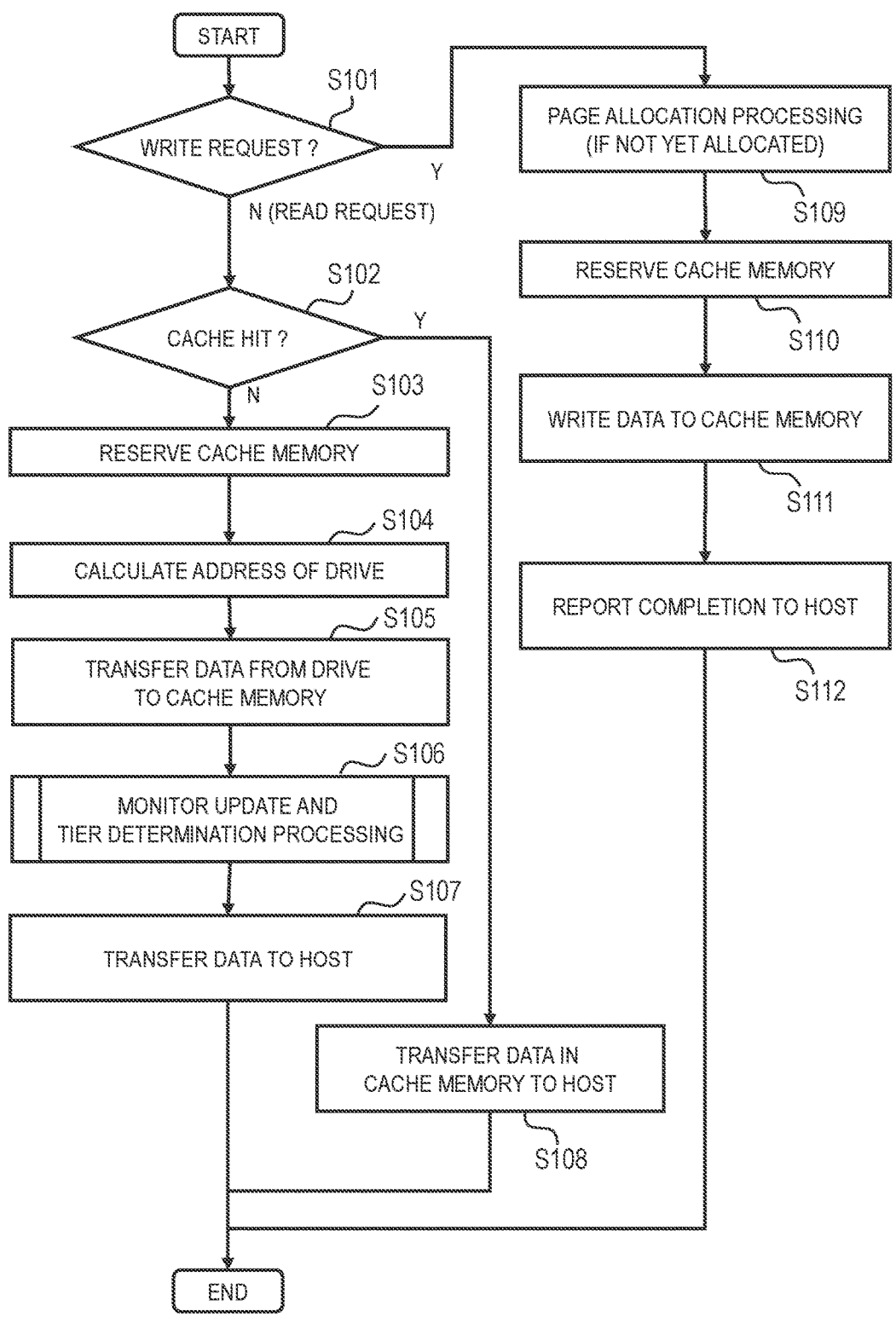
FIG. 16 is a flowchart of processing in response to a read request/write request for a virtual volume.

FIG. 16 is a flowchart of processing in response to a read request/write request for a virtual volume. Upon receipt of an I/O request from the host 101, the host I/O program 601 starts the processing.

The host I/O program 601 identifies the I/O request as a read request or a write request (S101). If the I/O request is a write request (S101: Y), the host I/O program 601 determines whether the designated virtual VOL page has been allocated a pool VOL page with reference to the dynamic mapping table 501. If no pool VOL page is allocated, the host I/O program 601 allocates an unused pool VOL page (S109).

The host I/O program 601 checks whether the cache memory has a free area sufficient for the address of the virtual volume designated by the I/O request and if not, reserves such an area in the cache memory (S110). Next, the host I/O program 601 writes the write data transferred from the host to the cache memory and sets a dirty flag in the cache management table 507 as the data in the cache area is not written to the drive (S111).

The dirty flag indicates a status where the data in the cache memory has not been saved in a disk. Next, the host I/O program 601 sends a report of completion to the host and terminates the processing.

If the I/O request is a read request (S101: N), the host I/O program 601 checks whether the data at the designated address of a virtual volume is in the cache memory (cache hit) (S102). In the case of cache hit (S102: Y), the host I/O program 601 transfers the data in the cache memory to the host (S108). After transferring all data requested by the host to the host, the host I/O program 601 sends a report of completion to the host and terminates the processing.

In the case of cache miss (S102: N), the host I/O program 601 reserves an area in the cache memory to store the data at the designated address (S103). Next, the host I/O program 601 checks whether a pool VOL page is allocated at the designated address with reference to the dynamic mapping table 501.

If no pool VOL page is allocated, the host I/O program 601 calculates an address of a drive storing a default value with reference to the dynamic mapping table 501 (S104) and transfers the default value from the drive to the area reserved in the cache memory (S105).

If a pool VOL page is allocated at the designated address, the host I/O program 601 acquires the pool volume number of the pool volume providing the pool VOL page and the logical address with reference to the dynamic mapping table 501 and further acquires the physical drive number and the physical start address with reference to the logical-physical address conversion table 504 (S104). Next, the host I/O program 601 transfers the data at the calculated drive address to the area reserved in the cache memory (S105).

In transferring data to the cache memory, the host I/O program 601 updates the monitoring information on the accessed virtual VOL page in the page monitoring table 503 and further, executes tier determination processing (S106). Next, the host I/O program 601 sends the data stored from the drive to the cache memory to the host (S107). After transferring all data requested by the host to the host, the host I/O program 601 sends a report of completion to the host and terminates the processing.

Figure 17:
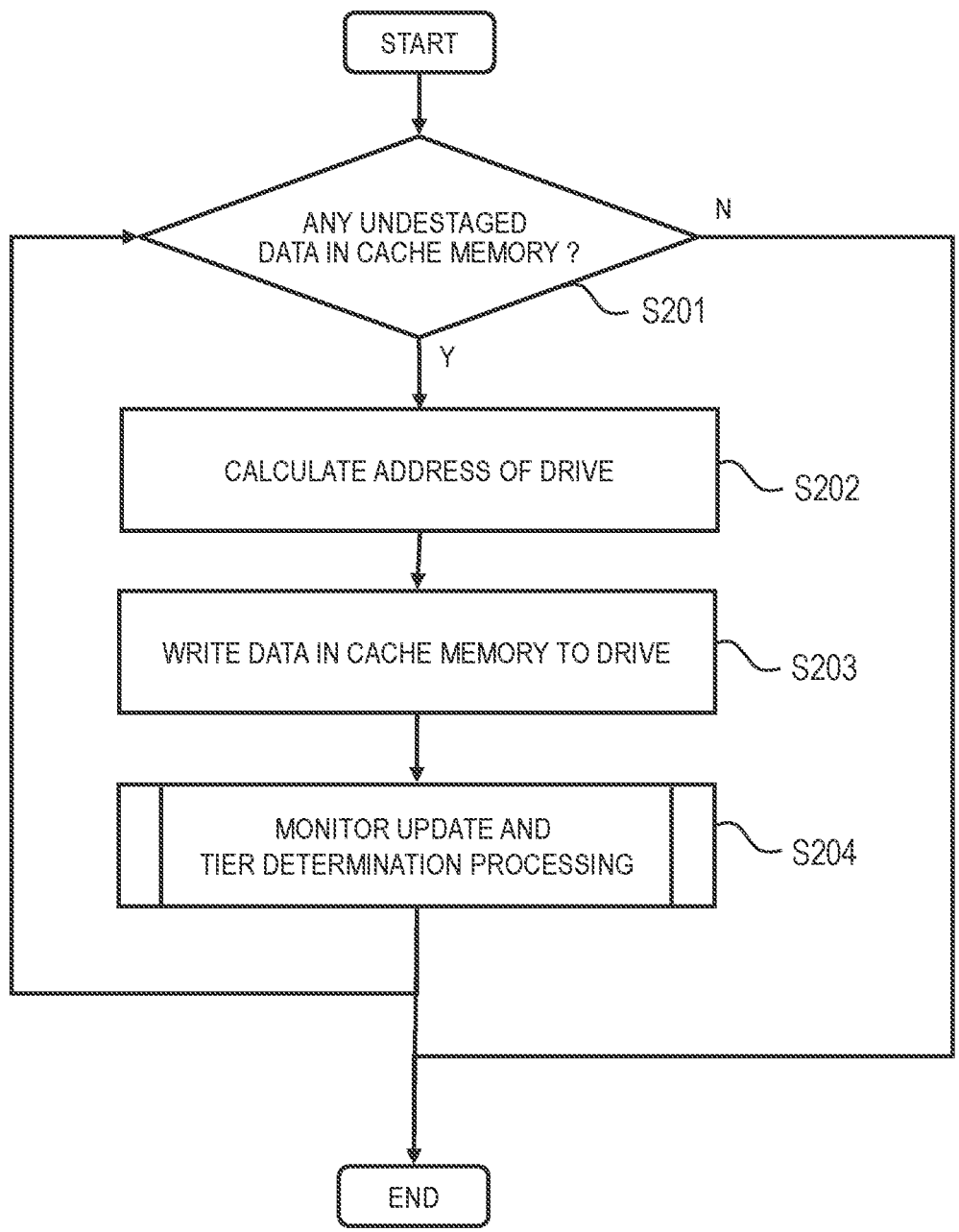
FIG. 17 is a flowchart of a destage program.

FIG. 17 is a flowchart of the destage program 604. As shown in FIG. 16, the host I/O program 601 writes write data from the host to the cache memory in response to a data write request from the host and then sets a dirty flag.

The destage program 604 periodically checks whether any dirty flag has been set with reference to the cache management table 507 (S201). If some cache area with a dirty flag set exists (S201: Y), the destage program 604 acquires the pool VOL number and the logical address from the dynamic mapping table 501 based on the virtual VOL number and the logical address associated with the dirty flag in the cache management table 507.

The destage program 604 acquires the address of the drive to store the data from the pool VOL number and the logical address with reference to the logical-physical address conversion table 504 (S202). The destage program 604 writes the dirty data in the cache memory to the address of the drive (S203). The dirty flag for the data is set to OFF.

The destage program 604 updates the monitoring information on the virtual VOL page in the page monitoring table 503 through the dynamic mapping table 501 and executes tier determination processing (S204). The destage program 604 returns to Step S201 and checks whether the cache memory includes undestaged data (S201). If the cache memory does not include undestaged data (S201: N), the destage program 604 terminates the processing.

Figure 18:
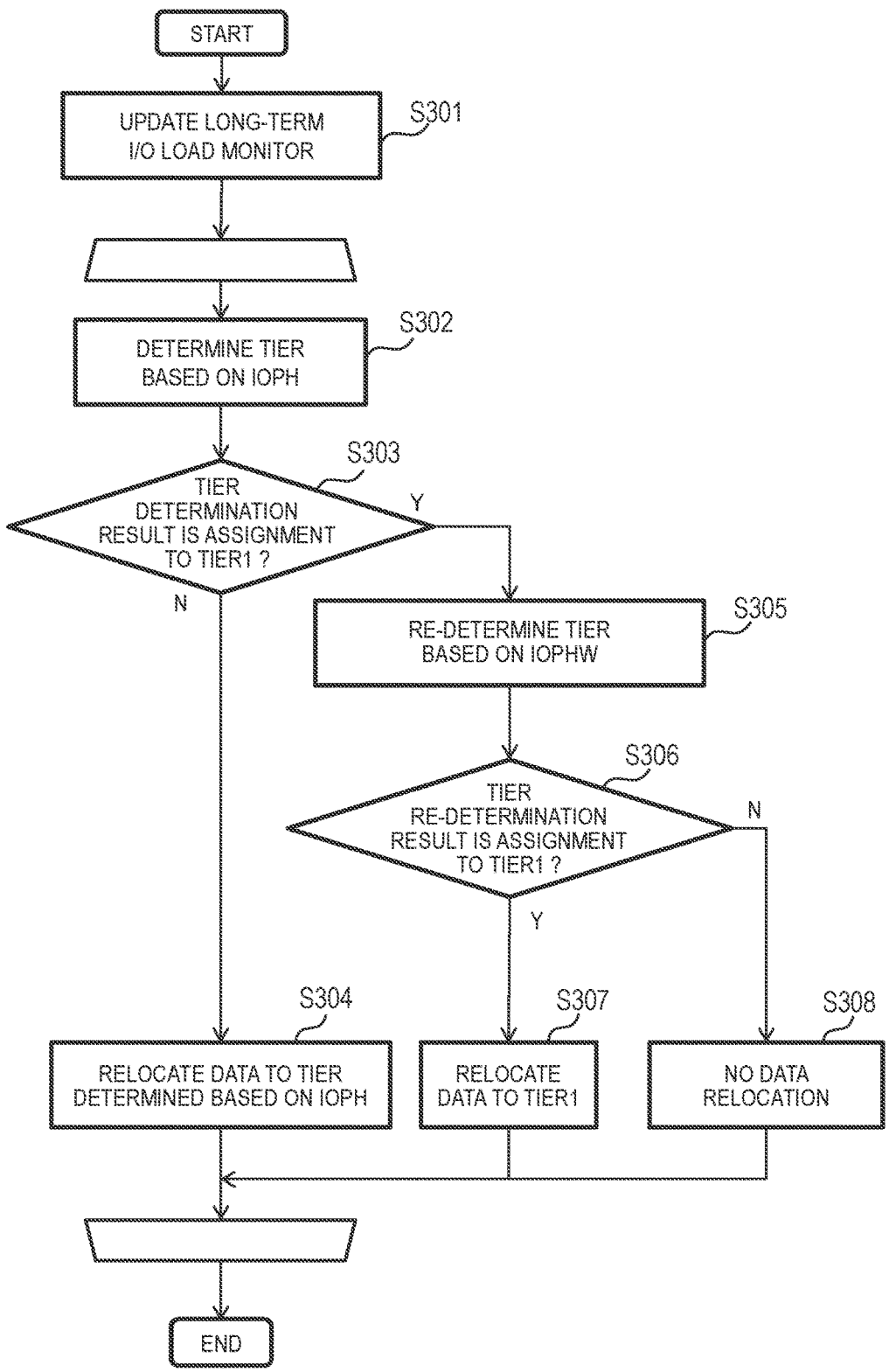
FIG. 18 is a flowchart of an asynchronous redistribution determination program.

FIG. 18 is a flowchart of the asynchronous redistribution determination program 606. The asynchronous redistribution determination program 606 is executed repeatedly in a cycle of long-term period, asynchronously with I/O processing inclusive of reception of an I/O request or destage. In this example, the long-term period is a predetermined specific period. Asynchronous redistribution performs tier determination and data reallocation on all pages at the same time to determine basic page distribution. The asynchronous redistribution determination program 606 determines a tier to be reassigned for a virtual VOL page using the long-term IOPH and IOPHW.

The asynchronous redistribution determination program 606 determines the tier to be reassigned for a virtual VOL page (page data) using the tier assignment thresholds determined in the frequency distribution table 505. The frequency distribution table 505 is created by the frequency distribution creation program 602. The frequency distribution creation program 602 is executed in a cycle of long-term period before execution of the asynchronous redistribution determination program 606.

The frequency distribution creation program 602 selects the entries of the page monitoring table 503 one by one, calculates the long-term IOPH of the virtual VOL page, and increments the page count at the corresponding load level in the frequency distribution. The long-term IOPH is a value obtained by dividing the sum of the values of the long-term read counter 531 and the long-term write counter 532 by the length of the long-term period (h).

Each tier assignment thresholds is calculated from the intersection of the maximum range for the pages that can be provided from a tier and the frequency distribution. The maximum range for the pages that can be provided from a tier is determined from the limit of the potential of the tier (the maximum I/Os that the tier can process) or the capacity of the tier. The tier assignment thresholds can be values specified by the user.

FIG. 18 illustrates determining by the asynchronous redistribution determination program 606 where to reassign a virtual VOL page. The asynchronous redistribution determination program 606 updates the information 530 of the long-term I/O load monitor in the page monitoring table 503 (S301). Specifically, the asynchronous redistribution determination program 606 updates the values of the previous IOPH 533 and the previous IOPHW 534 and resets the values of the long-term read counter 531 and the long-term write counter 532.

The value of the previous long-term IOPH 533 is a value obtained by dividing the sum of the values of the long-term read counter 531 and the long-term write counter 532 by the long-term period (h). The value of the previous IOPHW 534 is obtained by dividing the sum of the product of the value of the long-term read counter 531 by the read coefficient and the product of the value of the long-term write counter 532 by the write coefficient by the long-term period (h).

The asynchronous redistribution determination program 606 acquires the value of the IOPHW read coefficient 575 and the value of the IOPHW write coefficient 576 for the pool with reference to the Tier1 life management table 513.

The asynchronous redistribution determination program 606 selects entries of the page monitoring table 503 one by one and repeats Steps S302 to S308. The asynchronous redistribution determination program 606 acquires the value of the long-term IOPH of a virtual VOL page and compares the value with the tier assignment thresholds in the frequency distribution table 505 to determine the tier to be reassigned for the virtual VOL page (S302). If the long-term IOPH is higher than the tier assignment threshold 208A, the asynchronous redistribution determination program 606 determines to reassign the virtual VOL page to Tier1.

If the determination result of Step S302 is not Tier1 (S303: N), the asynchronous redistribution determination program 606 determines to reassign the virtual VOL page to the tier determined at Step S302. Where to reassign the virtual VOL page is different from or the same as the current tier.

If the determination result of Step S302 is Tier1 (S303: Y), the asynchronous redistribution determination program 606 acquires the value of the long-term IOPHW of the virtual VOL page and compares the value with the tier assignment thresholds in the frequency distribution table 505 to determine the tier to reassign the virtual VOL page (S305). If the long-term IOPHW is higher than the tier assignment threshold 208A, the asynchronous redistribution determination program 606 determines to reassign the virtual VOL page to Tier1.

If the determination result of Step S305 is not Tier1 (S306: N), the asynchronous redistribution determination program 606 determines to reassign the virtual VOL page to the current tier. If the determination result of Step S305 is Tier1 (S306: Y), the asynchronous redistribution determination program 606 determines to reassign the virtual VOL page to Tier1.

If page data needs to be relocated, the page redistribution program 605 relocates the page data from a tier to another. For example, the page redistribution program 605 acquires information on the virtual VOL page to be relocated and the reassigned tier from the asynchronous redistribution determination program 606. The asynchronous redistribution determination program 606 can identify the current tier (parity group) of the virtual VOL page with reference to the dynamic mapping table 501 and the pool VOL management table 502. The page redistribution program 605 relocates the page data in accordance with the acquired information and updates the dynamic mapping table 501.

Figure 19:
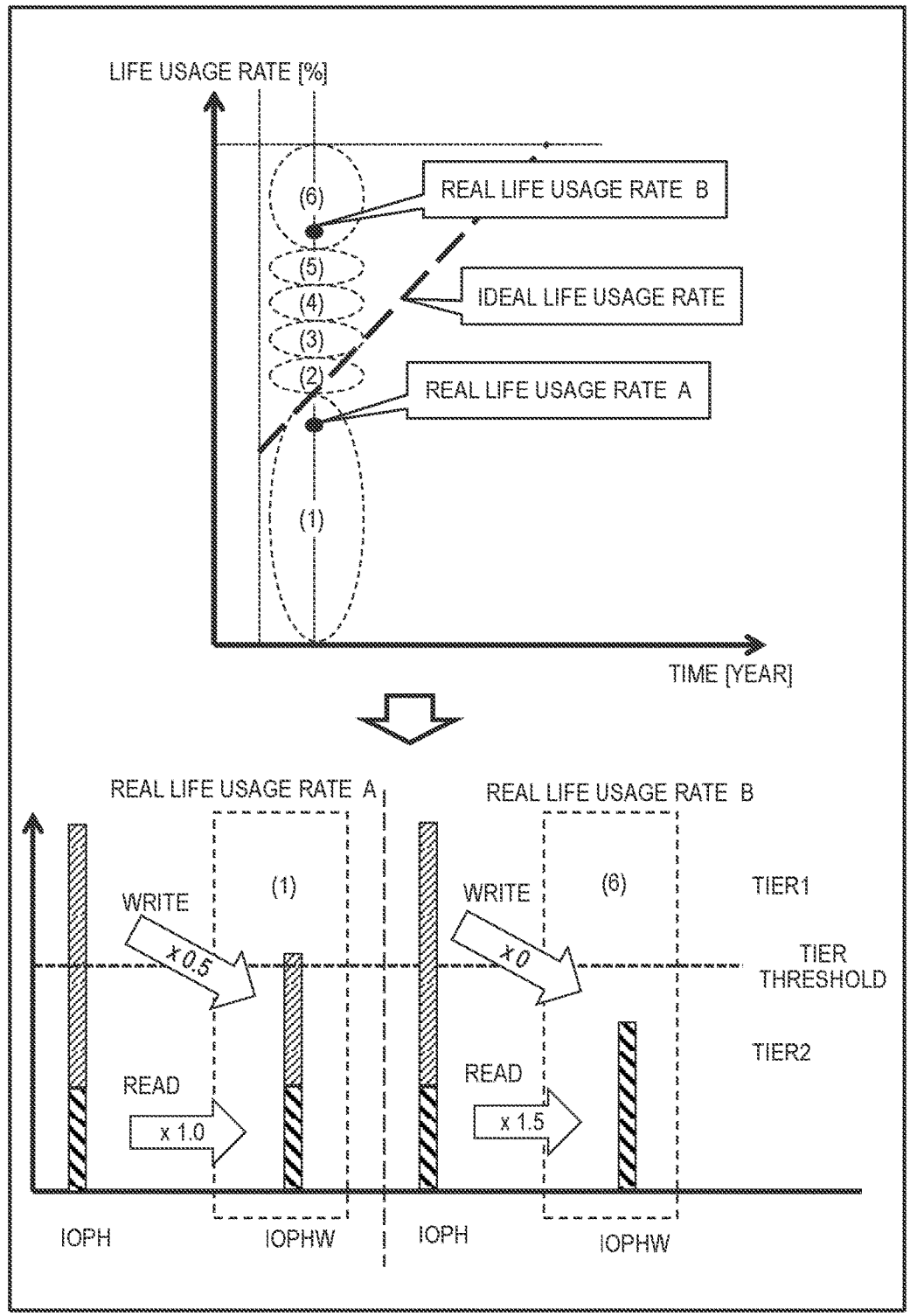
FIG. 19 illustrates an example of the relationship among the real life usage rate, the ideal life usage rate, the IOPH, and the IOPHW of Tier1.

FIG. 19 illustrates an example of the relationship among the real life usage rate, the ideal life usage rate, the IOPH, and the IOPHW of Tier1. The numerals in the regions surrounded by dashed lines in the graphs represent the entry numbers in the read coefficient and write coefficient setting table 508.

The real life usage rate A is lower than the ideal life usage rate and corresponds to the entry number 1 in the read coefficient and write coefficient setting table 508. In the entry, the read coefficient is 1.0 and the write coefficient is 0.5. Both of the IOPH and the IOPHW of the page data at the real life usage rate A are higher than the tier assignment threshold; the page data is relocated to Tier1.

The real life usage rate B is higher than the ideal life usage rate and corresponds to the entry number 6 in the read coefficient and write coefficient setting table 508. In the entry, the read coefficient is 1.5 and the write coefficient is 0. The IOPH of the page data at the real life usage rate B is higher than the tier assignment threshold and the IOPHW is lower than the tier assignment threshold. The page data is not relocated from the current tier.

As described above, promotion from a lower tier to Tier1 requires that the IOPH is higher than the tier threshold and further, the IOPHW is also higher than the tier threshold. The IOPHW is determined in view of the life of Tier1; the write coefficient gets smaller as the remaining life of Tier1 becomes shorter. That is to say, the possibility to relocate data in a page written frequently to Tier1 decreases even if the long-term I/O frequency is high.

As a result, the increase in real life usage rate diminishes to reduce the deviation of the real life usage rate from the ideal life usage rate, when the real life usage rate is higher than the ideal life usage rate. Furthermore, the read coefficient becomes larger as the remaining life of Tier1 becomes shorter, so that drop of the hit rate of Tier1 can be prevented.

The above-described example determines the tier based on only the long-term I/O frequency indicator. The asynchronous redistribution determination program 606 may also consult a short-term I/O frequency indicator. For example, the asynchronous redistribution determination program 606 may calculate a short-term IOPH from the value of the short-term I/O counter 538, the value of the time of previous determination 539, and the current time and if the calculated value is higher than a specific value, keep the virtual VOL page assigned to Tier1 in Tier1. As a result, page data whose I/O frequency has abruptly increased and maintaining the condition can be kept in Tier1.

Figure 20:
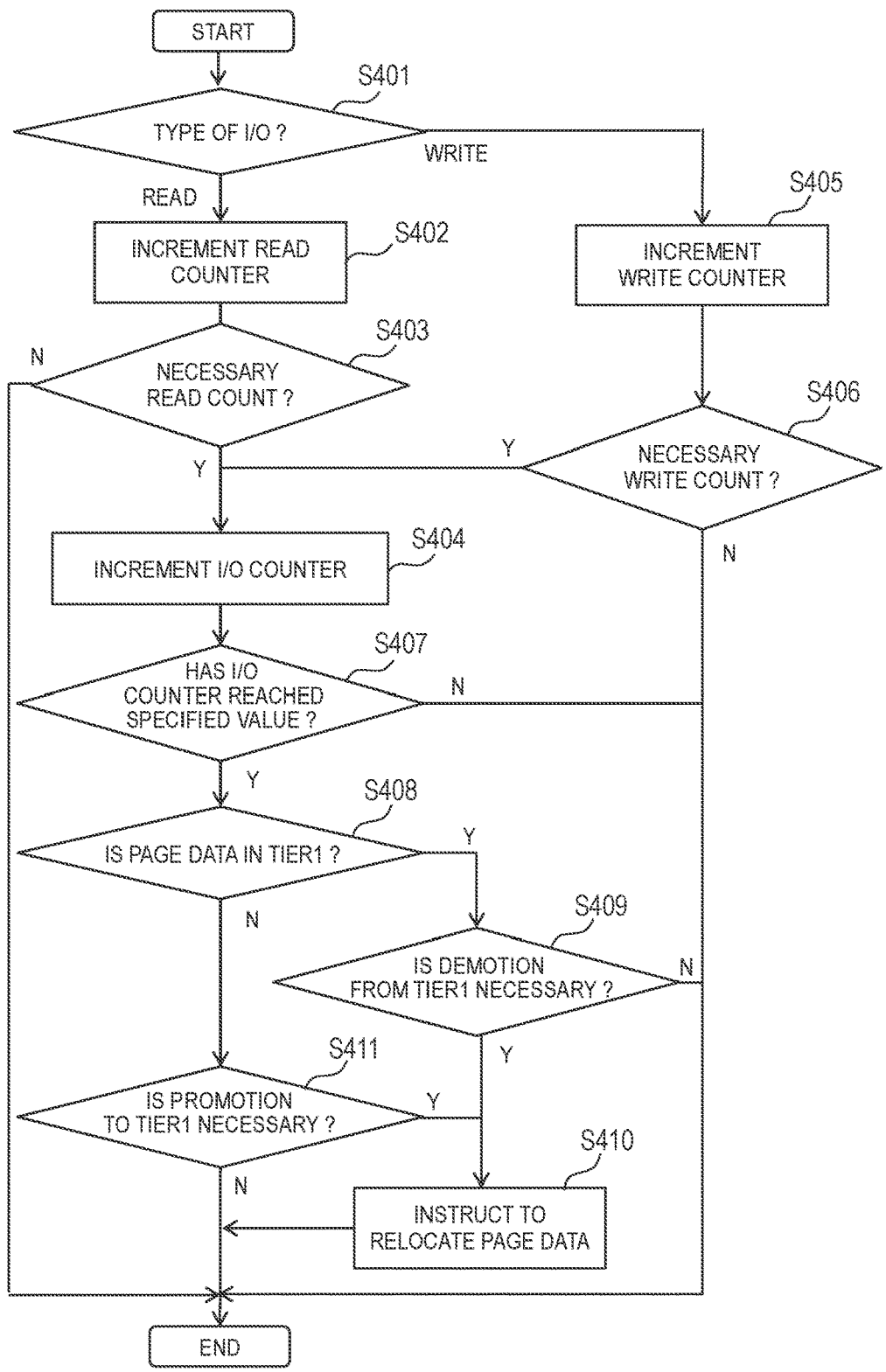
FIG. 20 is a flowchart of operation of a monitor update and tier determination program.

FIG. 20 is a flowchart of operation of the monitor update and tier determination program 603. The monitor update and tier determination program 603 is invoked by the host I/O program 601 synchronously with receipt of a read request and also invoked by the destage program 604 synchronously with destage. The receipt of a read request and destage are included in I/O processing; the monitor update and tier determination program 603 executes tier determination and data reallocation for a page synchronously with I/O processing. FIG. 20 illustrates processing in response to a single access.

The monitor update and tier determination program 603 identifies the type of the I/O that has triggered the invocation as a read request or a write request (S401). The monitor update and tier determination program 603 acquires information on the I/O from the invocator to identify the I/O type with reference to the information.

If the I/O type is read (S401: READ), the monitor update and tier determination program 603 increments the values of the long-term read counter 531 and the short-term read counter 536 of the corresponding entry of the page monitoring table 503 (S402).

The monitor update and tier determination program 603 determines whether the current value of the short-term read counter 536 satisfies the condition on the read count necessary to increment the value of the short-term I/O counter 538 (S403). For example, the monitor update and tier determination program 603 acquires the value of the necessary read count 577 for the pool to be accessed from the Tier1 life management table 513 and determines whether the value of the short-term read counter 536 is a multiple of the value of the necessary read count 577. The monitor update and tier determination program 603 may use another counter to count the necessary read count.

If the condition on the necessary read count is satisfied (S403: Y), the monitor update and tier determination program 603 increments the value of the short-term I/O counter 538 (S404). If the condition on the necessary read count is not satisfied (S403: N), the monitor update and tier determination program 603 terminates the processing.

If, at Step S401, the I/O type is write (S401: WRITE), the monitor update and tier determination program 603 increments the values of the long-term write counter 532 and the short-term write counter 537 of the corresponding entry of the page monitoring table 503 (S405).

The monitor update and tier determination program 603 determines whether the current value of the short-term write counter 537 satisfies the condition on the write count necessary to increment the value of the short-term I/O counter 538 (S406). For example, the monitor update and tier determination program 603 acquires the value of the necessary write count 578 for the pool to be accessed from the Tier1 life management table 513 and determines whether the value of the short-term write counter 537 is a multiple of the value of the necessary write count 578. The monitor update and tier determination program 603 may use another counter to count the necessary write count.

If the condition on the necessary write count is satisfied (S406: Y), the monitor update and tier determination program 603 increments the value of the short-term I/O counter 538 (S404). If the condition on the necessary write count is not satisfied (S406: N), the monitor update and tier determination program 603 terminates the processing.

At Step S407, the monitor update and tier determination program 603 determines whether the value of the short-term I/O counter 538 has reached a specified value. The value can be specified differently depending on the pool and stored in the parameter table 506 in advance. If the value of the short-term I/O counter 538 has not reached the specified value (S407: N), the monitor update and tier determination program 603 terminates the processing.

If the value of the short-term I/O counter 538 has reached the specified value (S407: Y), the monitor update and tier determination program 603 determines whether the page data of the designated virtual VOL page is in Tier1 (S408). The monitor update and tier determination program 603 can locate the tier (parity group) where the designated virtual VOL page is assigned with reference to the dynamic mapping table 501 and the pool VOL management table 502.

If the designated page data is in Tier1 (S408: Y), the monitor update and tier determination program 603 determines whether to demote the page data from Tier1 (S409).

Specifically, the monitor update and tier determination program 603 calculates the long-term IOPH and the short-term IOPH irrelevant to the life of Tier1. Since where to demote the page data is a tier except for Tier1, the monitor update and tier determination program 603 does not take account of the relationship between the write frequency and the life of Tier1.

The monitor update and tier determination program 603 divides the sum of the values of the long-term read counter 531 and the long-term write counter 532 by the elapsed time in the current long-term period to calculate the long-term IOPH. The monitor update and tier determination program 603 divides the sum of the values of the short-term read counter 536 and the short-term write counter 537 by the length of the current short-term period to calculate the short-term IOPH. The length of the current short-term period is the value obtained by subtracting the time of the previous determination from the current time.

If the long-term IOPH is lower than a predetermined threshold DT and the short-term IOPH is lower than DT×M, the monitor update and tier determination program 603 determines to demote the page data. The M is a constant greater than 1. The values of DT and M can be different depending on the pool or the parity group and stored in the parameter table 506, for example. The M reduces the repeat of redistribution based on the short-term I/O frequency. The conditions to execute demotion may include that the usage of Tier1 is higher than a specific value.

If determining that demotion is necessary (S409: Y), the monitor update and tier determination program 603 instructs the page redistribution program 605 to relocate page data (S410) and terminates the processing. If not determining that demotion is necessary (S409: N), the monitor update and tier determination program 603 terminates the processing. Before terminating the processing, the monitor update and tier determination program 603 resets the values of the short-term I/O load monitor 535 to the initial values.

If the designated page data is not in Tier1 (S408: N), the monitor update and tier determination program 603 determines whether to promote the page data to Tier1 (S411).

The monitor update and tier determination program 603 determines whether the page data can be relocated in view of the usage of Tier1. If the difference of the usage of Tier1 from the capacity is smaller than a specific value, promotion is not executed. If the free space of Tier1 is larger than a specific size, the monitor update and tier determination program 603 calculates the long-term I/O frequency (IO-PHW) and the indicator of the short-term I/O frequency in view of the life of Tier1. The indicator of the short-term I/O frequency is referred to as short-term IOPHW here.

The monitor update and tier determination program 603 acquires the values of the IOPHW read coefficient 575 and the IOPHW write coefficient 576 for the corresponding pool from the Tier1 life management table 513. The monitor update and tier determination program 603 calculates the product sum of the values of the long-term read counter 531 and the long-term write counter 531 multiplied by the coefficients and divides the product sum by the elapsed time of the current long-term period to obtain the long-term IOPHW.

Furthermore, the monitor update and tier determination program 603 divides the value of the short-term I/O counter 538 by the length of the current short-term period to obtain the short-term IOPHW in view of the life of Tier1. The value of the short-term I/O counter 538 is a fixed value and the short-term IOPHW is determined depending on the length of the short-term period.

If the long-term IOPHW is higher than a predetermined threshold PT or if the short-term IOPHW is higher than PT×M, the monitor update and tier determination program 603 determines to promote the page data. The threshold PT is a value greater than the threshold DT and the M is a constant greater than 1. The M can be the same as or different from the value referenced in determination of demotion. The values of PT and M can be different depending on the pool or the parity group and stored in the parameter table 506, for example. The M reduces the repeat of redistribution based on the short-term I/O frequency.

If determining that promotion is necessary (S411: Y), the monitor update and tier determination program 603 instructs the page redistribution program 605 to relocate page data (S410) and terminates the processing. If not determining that promotion is necessary (S411: N), the monitor update and tier determination program 603 terminates the processing. Before terminating the processing, the monitor update and tier determination program 603 resets the values of the short-term I/O load monitor 535 to the initial values.

As described above, the monitor update and tier determination program 603 increments the short-term I/O counter 538 each time the read count reaches a specific value or the write count reaches a specific value and determines the short-term IOPHW in accordance with the time (short-term period) for the short-term I/O counter 538 to reach a specified value. As a result, the short-term IOPHW is determined based on the necessary read count (weight), the necessary write count (weight), the read count (frequency) in the short-term period, and the write count (frequency) in the short-term period.

Figure 21:
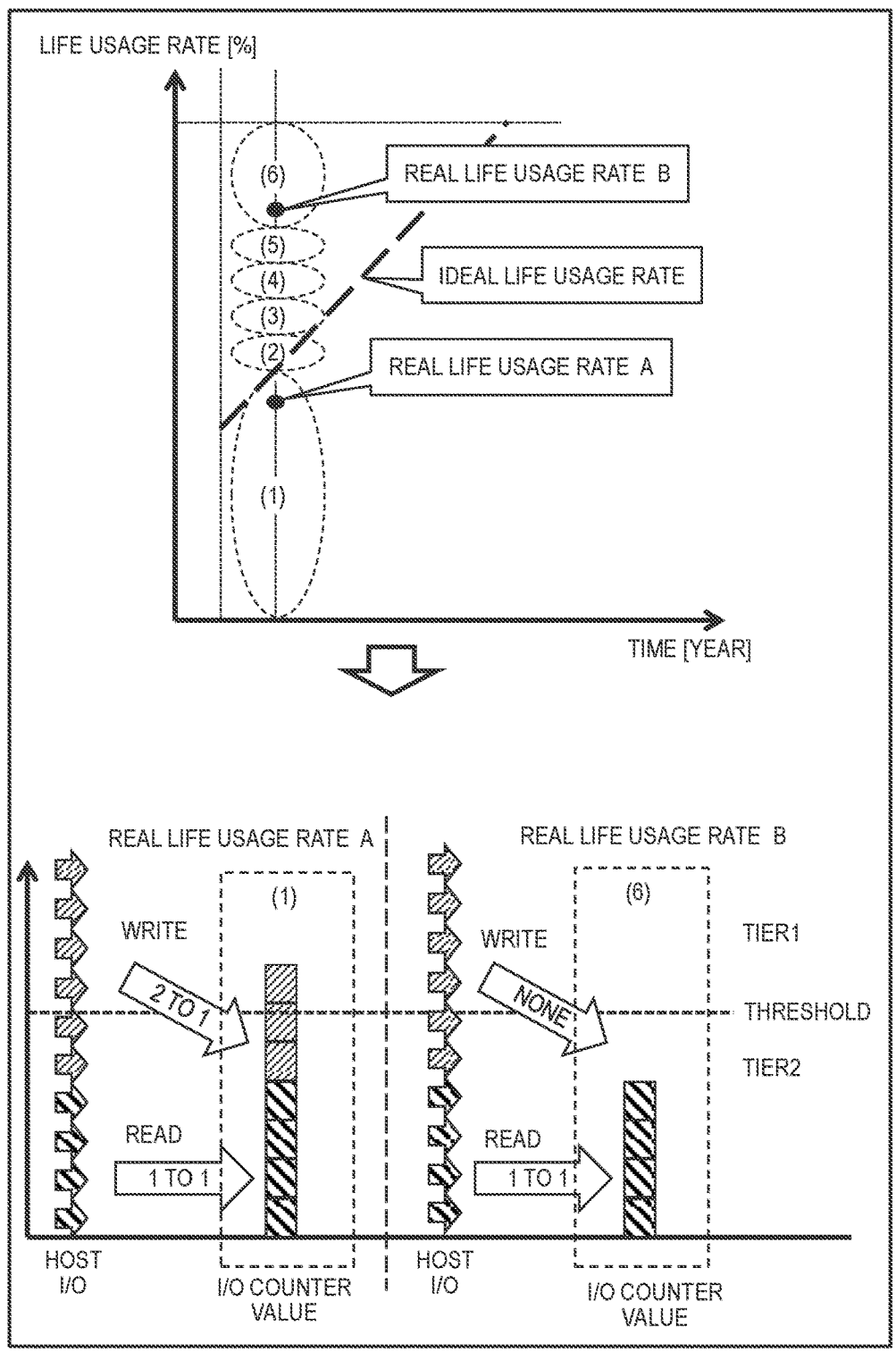
FIG. 21 illustrates an example of the relationship among the real life usage rate, the ideal life usage rate, the host I/O count, and the short-term I/O counter value of Tier1.

FIG. 21 illustrates an example of the relationship among the real life usage rate, the ideal life usage rate, the host I/O count, and the short-term I/O counter value of Tier1. The numerals in the regions surrounded by dashed lines in the graphs represent the entry numbers in the necessary read count and write count setting table 509.

The real life usage rate A is lower than the ideal life usage rate and corresponds to the entry number 1 in the necessary read count and write count setting table 509. In the entry, the necessary read count is 1 and the necessary write count is 2. The value of the short-term I/O counter for the page data at the real life usage rate A is higher than the threshold for the short-term period; the page data is relocated to Tier1.

The real life usage rate B is higher than the ideal life usage rate and corresponds to the entry number 6 in the necessary read count and write count setting table 509. In the entry, the necessary read count is 1 and the necessary write count is not specified, that is, the short-term I/O counter is not incremented in response to a write. The value of the short-term I/O counter for the page data at the real life usage rate B is lower than the threshold for the short-term period; the page data is not relocated to Tier1.

As described above, promotion to Tier1 is determined with reference to the long-term IOPHW and the short-term IOPHW in view of the life of Tier1. As to the long-term IOPHW, the write coefficient becomes smaller as the real life usage rate of Tier1 becomes higher than the ideal life usage rate. The short-term IOPHW is a value obtained by dividing the value of the short-term I/O counter 538 by the length of the short-term period; as the real life usage rate of Tier1 becomes higher than the ideal life usage rate, the write count required to increment the short-term I/O counter 538 becomes larger.

That is to say, the possibility that data in a page frequently written is relocated to Tier1 is lowered in view of the policies for both of the long-term IOPHW and the short-term IOPHW. As a result, the increase in real life usage rate diminishes to reduce the deviation of the real life usage rate from the ideal life usage rate when the real life usage rate is higher than the ideal life usage rate. Further, determining the length of the short-term period in accordance with the value of the short-term I/O counter 538 enables detection of a page where the access frequency increases abruptly. Further, this configuration eliminates the processing on the pages where the access frequency does not increase, achieving high processing efficiency.

In the foregoing example, the monitor update and tier determination program 603 refers to the long-term I/O frequency indicator and the short-term I/O frequency indicator in view of the lifetime of Tier1; however, the monitor update and tier determination program 603 may refer to only the short-term I/O frequency indicator. When the short-term period is longer than a specific period, it is no longer short enough, compared to the long-term period. Accordingly, if (current time−time of previous determination) is longer than a specific time length, the determination with reference to the short-term IOPHW may be omitted.

The above-described methods of calculating the long-term I/O frequency indicator and the short-term I/O frequency indicator are merely examples and other methods may be employed. For example, the long-term page redistribution may be executed when the I/O count in a long-term period reaches a specified value. The value specified for the long-term period is sufficiently greater than the value set to the short-term I/O counter. The short-term period may have a fixed length shorter than the long-term period.

The above-described example determines whether to relocate page data to Tier1 in view of the life usage rate of Tier1 in both of the long-term redistribution (asynchronous redistribution from I/O) and the short-term redistribution (synchronous redistribution with I/O). The storage system 104 may take account of the life usage rate of Tier1 in only either one of these redistributions. The storage system 104 does not have to execute either one of the long-term redistribution and the short-term redistribution.

Figure 22:
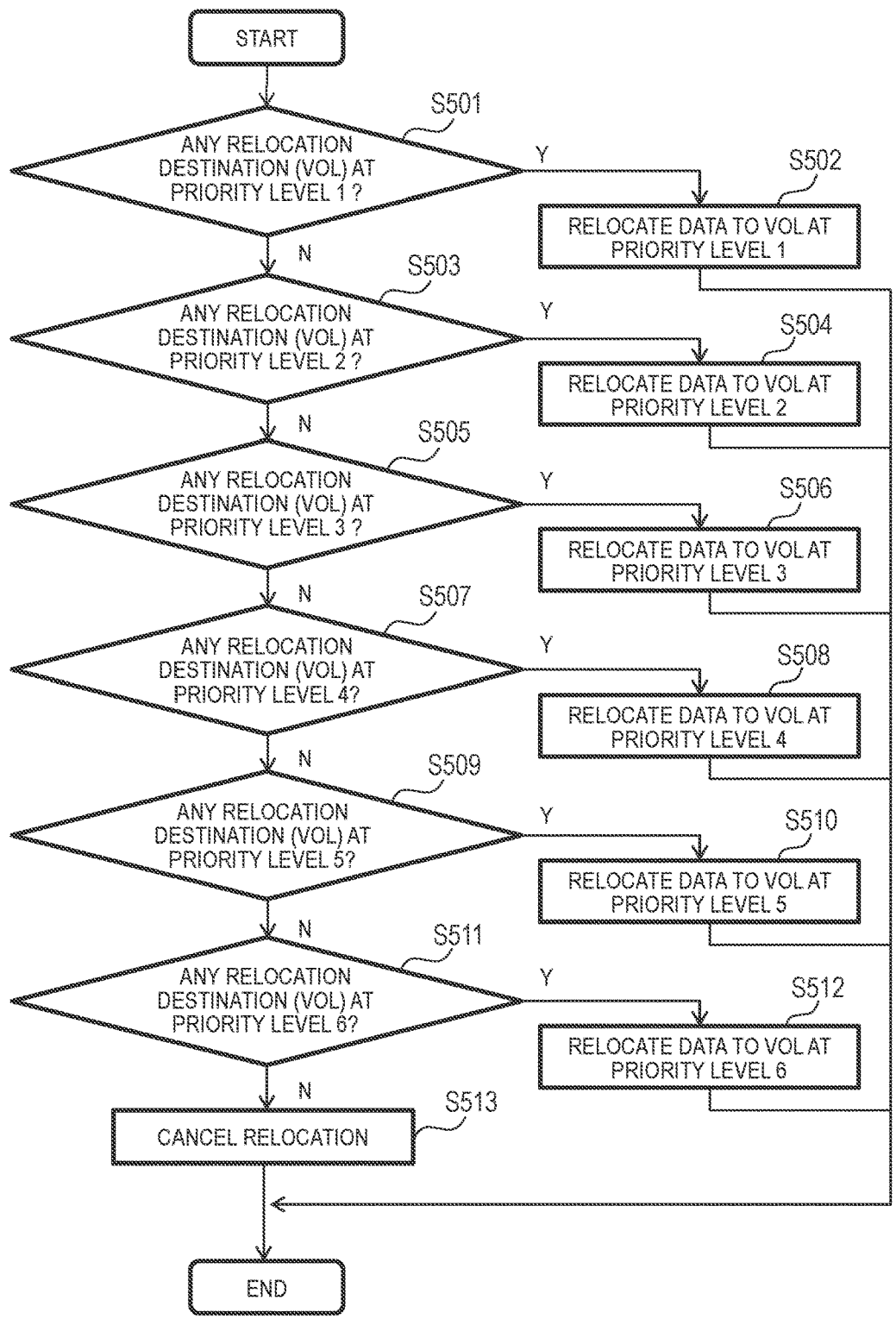
FIG. 22 is a flowchart of processing of the monitor update and tier determination program to determine the destination parity group in relocating page data from a lower tier to Tier1.

FIG. 22 is a flowchart of processing of the monitor update and tier determination program 603 to determine the destination parity group in relocating page data from a lower tier to Tier1. The monitor update and tier determination program 603 determines the destination parity group based on the real life usage rate. As a result, the life consumption paces can be leveled among parity groups.

First, the monitor update and tier determination program 603 determines whether the Tier1 of the pool associated with the virtual VOL page has a destination (pool volume) at the priority level 1. Specifically, the monitor update and tier determination program 603 searches for a pool volume at the priority level 1 and having a remaining space (capacity−usage) larger than a specific size in the associated pool with reference to the pool VOL management table 502 and the relocation destination pool VOL priority level management table 514. If a pool volume satisfying the conditions exists (S501: Y), the monitor update and tier determination program 603 determines to relocate the page data to the pool volume (S502).

If no pool volume at the priority level 1 exists (S501: N), the monitor update and tier determination program 603 determines whether the Tier1 of the pool associated with the virtual VOL page has a destination (pool volume) at the next priority level 2 (S503). The determination method is the same as Step S501. If a pool volume satisfying the conditions exists (S503: Y), the monitor update and tier determination program 603 determines to relocate the page data to the pool volume (S504).

If no pool volume at the priority level 2 exists (S503: N), the monitor update and tier determination program 603 determines whether the Tier1 of the pool associated with the virtual VOL page has a destination (pool volume) at the next priority level 3 (S505). Likewise, the monitor update and tier determination program 603 successively searches for a destination in order of priority, from high to low (S506 to S512). If no destination is found, the monitor update and tier determination program 603 determines not to relocate the page data to Tier1.

It should be noted that this invention is not limited to the above-described embodiments but include various modifications. For example, the above-described embodiments have provided details for the sake of better understanding of this invention; they are not limited to those including all the configurations that have been described. A part of the configuration of each embodiment may be replaced with a configuration of another embodiment or a configuration of an embodiment may be incorporated to a configuration of another embodiment. A part of the configuration of each embodiment may be added, deleted, or replaced by that of a different configuration.

The above-described configurations, functions, and processing units, for all or a part of them, may be implemented by hardware: for example, by designing an integrated circuit. The above-described configurations and functions may be implemented by software, which means that a processor interprets and executes programs providing the functions. The information of programs, tables, and files to implement the functions may be stored in a storage device such as a memory, a hard disk drive, or an SSD (Solid State Drive), or a storage medium such as an IC card, or an SD card. The drawings shows control lines and information lines as considered necessary for explanations but do not show all control lines or information lines in the products. It can be considered that most of all components are actually interconnected.

What is claimed is:
1. A storage system configured to allocate storage areas from a plurality of tiers including a first tier and a second tier to a virtual volume, the storage system comprising:
   a plurality of first storage devices configured to provide storage areas of the first tier, a life usage rate of each of the plurality of first storage devices being determined based on an erase count and a guaranteed maximum erase count;
   a plurality of second storage devices configured to provide storage areas of the second tier, a guaranteed maximum erase count not being specified for each of the plurality of second storage devices; and a controller configured to perform data reallocation between the first tier and the second tier, wherein the controller is configured to:

determine a weight for a read access and a weight for a write access from a host based on life usage rates of the plurality of first storage devices; and determine whether to relocate data stored in the second tier to the first tier based on the weight for a read access, the weight for a write access, a read count for the data in a period, and a write count for the data in the period.

2. The storage system according to claim 1, wherein the controller is configured to:

calculate a read frequency and a write frequency in the period;

adjust the read frequency and the write frequency with the weight for a read access and the weight for a write access, respectively;

determine a first I/O frequency indicator in the period using the adjusted read frequency and write frequency; and determine whether to relocate the data to the first tier based on the first I/O frequency indicator.

3. The storage system according to claim 2, wherein the controller is configured to:

determine a second I/O frequency indicator in the period by summing the read frequency and the write frequency; and determine to relocate the data to the first tier in a case where the first I/O frequency indicator and the second I/O frequency indicator are higher than a threshold.

4. The storage system according to claim 1, wherein the weight for a read access is a read count necessary to change a value of a counter by one unit, wherein the weight for a write access is a write count necessary to change a value of the counter by one unit, and wherein the controller is configured to:

change a value of the counter each time number of read accesses to the data reaches the necessary read count;

change a value of the counter each time number of write accesses to the data reaches the necessary write count; and determine whether to relocate the data to the first tier based on time taken for the counter to count from an initial value to a predetermined value.

5. The storage system according to claim 1, wherein the controller is configured to:

measure read count and write count on the data in a first period;

determine a first read weight for a read access and a first write weight for a write access in the first period based on the life usage rates of the plurality of first storage devices;

calculate a first I/O frequency indicator in the first period based on the read count and write count in the first period, the first read weight, and the first write weight;

determine whether to relocate the data to the first tier based on the first I/O frequency indicator;

measure read count and write count on the data in a second period shorter than the first period;

determine a second read weight for a read access and a second write weight for a write access in the second period based on the life usage rates of the plurality of first storage devices;

calculate a second I/O frequency indicator in the second period based on the read count and write count in the second period, the second read weight, and the second write weight; and determine whether to relocate the data to the first tier based on the second I/O frequency indicator.

6. The storage system according to claim 1, wherein the plurality of first storage devices are divided into a plurality of groups, and wherein the controller is configured to:

manage life usage rates of the plurality of groups; and determine a group where to relocate the data based on the life usage rates of the plurality of groups.

7. The storage system according to claim 1, wherein the plurality of first storage devices are divided into a plurality of groups, wherein the first tier is allocated a storage area from each of the plurality of groups, and wherein the controller is configured to:

determine a life usage rate of each of the plurality of groups based on life usage rates of first storage devices constituting the group;

determine a life usage rate of the first tier based on the life usage rates of the plurality of groups and storage capacities allocated from the plurality of groups to the first tier; and determine the weight for a read access and the weight for a write access from the host based on the life usage rate of the first tier.

8. The storage system according to claim 1, wherein the controller is configured to:

determine ideal life usage rates of the plurality of first storage devices based on ages of service;

acquire information on real life usage rates of the plurality of first storage devices from the plurality of first storage devices; and determine the weight for a read access from a host and the weight for a write access from a host based on differences between the ideal life usage rates and the real life usage rates of the plurality of first storage devices.

* * * * *